US012562102B2

(12) United States Patent
Kim et al.

(10) Patent No.: US 12,562,102 B2
(45) Date of Patent: Feb. 24, 2026

(54) PIXEL CIRCUIT AND DISPLAY APPARATUS INCLUDING THE SAME

(71) Applicant: Samsung Display Co., LTD., Yongin-si (KR)

(72) Inventors: Kwihyun Kim, Yongin-si (KR); Yeonkyung Kim, Yongin-si (KR); Sehyun Lee, Yongin-si (KR); Haksun Chang, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 18/744,099

(22) Filed: Jun. 14, 2024

(65) Prior Publication Data

US 2025/0078734 A1 Mar. 6, 2025

(30) Foreign Application Priority Data

Sep. 6, 2023 (KR) ........................ 10-2023-0118560

(51) Int. Cl.
*H01L 27/32* (2006.01)
*G09G 3/32* (2016.01)

(52) U.S. Cl.
CPC ....... *G09G 3/32* (2013.01); *G09G 2310/0267* (2013.01); *G09G 2310/0275* (2013.01); *G09G 2310/08* (2013.01); *G09G 2330/021* (2013.01)

(58) Field of Classification Search
CPC ............. G09G 3/32; G09G 2310/0267; G09G 2310/0275; G09G 2310/08; G09G 2330/021; G09G 3/2081
USPC .......................................................... 257/443
See application file for complete search history.

(56) References Cited

U.S. PATENT DOCUMENTS

| | | | | |
|---|---|---|---|---|
| 2022/0114951 | A1* | 4/2022 | Chang | G09G 3/32 |
| 2023/0078842 | A1* | 3/2023 | Kim | G09G 3/2081 257/443 |

FOREIGN PATENT DOCUMENTS

| | | |
|---|---|---|
| KR | 10-2022-0052265 | 4/2022 |
| KR | 10-2022-0138706 | 10/2022 |
| KR | 10-2022-0146220 | 11/2022 |

(Continued)

OTHER PUBLICATIONS

Extended European Search Report dated Jan. 29, 2025, in European Patent Application No. 24198914.4.

*Primary Examiner* — Abdul-Samad A Adediran
(74) *Attorney, Agent, or Firm* — CANTOR COLBURN LLP

(57) ABSTRACT

A pixel circuit includes a first transistor including a control electrode electrically connected to a first node, a first electrode electrically connected to a second node and a second electrode electrically connected to a third node, a second transistor configured to apply a first data voltage to the first transistor, a third transistor electrically connected to the first node and the third node, a fourth transistor including a control electrode electrically connected to a fourth node, a first electrode electrically connected to a fifth node and a second electrode electrically connected to a sixth node, a fifth transistor configured to apply a second data voltage to the fourth transistor, a sixth transistor electrically connected to the fourth node and the sixth node and a light emitting element that emits light based on the first data voltage and the second data voltage.

23 Claims, 21 Drawing Sheets

(56) References Cited

FOREIGN PATENT DOCUMENTS

| | | |
|---|---|---|
| KR | 10-2023-0023482 | 2/2023 |
| KR | 10-2023-0029235 | 3/2023 |

* cited by examiner

PIXEL CIRCUIT AND DISPLAY APPARATUS INCLUDING THE SAME

CROSS-REFERENCE TO RELATED APPLICATIONS

This application claims priority under 35 U.S.C. § 119 from Korean Patent Application No. 10-2023-0118560 filed on Sep. 6, 2023 in the Korean Intellectual Property Office, the entire contents of which are incorporated herein by reference.

BACKGROUND

1. Technical Field

Embodiments of the disclosure relate to a pixel circuit driven according to a pulse width modulation technique, operating an internal compensation of a threshold voltage, including fewer transistors, and thus, applicable to a ultra-high resolution display apparatus and a display apparatus including the pixel circuit.

2. Description of the Related Art

Generally, a display apparatus includes a display panel and a display panel driver. The display panel includes multiple gate lines, multiple data lines, multiple emission lines and multiple pixels. The display panel driver includes a gate driver, a data driver, an emission driver and a driving controller. The gate driver outputs gate signals to the gate lines. The data driver outputs data voltages to the data lines. The emission driver outputs emission signals to the emission lines. The driving controller controls the gate driver, the data driver and the emission driver.

An earlier pixel circuit driven according to a pulse width modulation technique and operating internal compensation of the threshold voltage may include nineteen or more transistors and three or more capacitors. In case that the pixel circuit includes nineteen or more transistors and three or more capacitors, the pixel circuit may not be applied to an ultra-high resolution display apparatus due to a limitation in integration.

SUMMARY

Embodiments of the inventive concept provide a pixel circuit driven according to a pulse width modulation technique, operating an internal compensation of a threshold voltage, including fewer transistors, and thus, applicable to a ultra-high resolution display apparatus.

Embodiments of the inventive concept also provide a display apparatus including the pixel circuit.

In an embodiment of a pixel circuit according to the inventive concept, the pixel circuit may include a first transistor including a control electrode electrically connected to a first node, a first electrode electrically connected to a second node and a second electrode electrically connected to a third node, a second transistor configured to apply a first data voltage to the first transistor, a third transistor electrically connected to the first node and the third node, a fourth transistor including a control electrode electrically connected to a fourth node, a first electrode electrically connected to a fifth node and a second electrode electrically connected to a sixth node, a fifth transistor configured to apply a second data voltage to the fourth transistor, an sixth transistor electrically connected to the fourth node and the sixth node and a light emitting element that emits light based on the first data voltage and the second data voltage.

In an embodiment, the pixel circuit may further include a first capacitor including a first electrode that receives a sweep signal and a second electrode electrically connected to the first node.

In an embodiment, the pixel circuit may further include a second capacitor including a first electrode that receives a second power voltage and a second electrode electrically connected to the fourth node.

In an embodiment, the pixel circuit may further include a seventh transistor electrically connected to the third node and the fourth node, an eighth transistor electrically connected to the sixth node and an anode electrode of the light emitting element and a ninth transistor configured to apply an initialization voltage to the anode electrode.

In an embodiment, the third transistor, the seventh transistor, the sixth transistor, the eighth transistor and the ninth transistor may be turned on in an initialization period.

In an embodiment, the third transistor, the seventh transistor, the sixth transistor, the eighth transistor and the ninth transistor may be turned on and the initialization voltage may have a first voltage in a first initialization period. The third transistor may be turned off, the sixth transistor, the eighth transistor and the ninth transistor may be turned on and the initialization voltage may have the first voltage in a second initialization period subsequent to the first initialization period. The third transistor and the sixth transistor may be turned off, the eighth transistor and the ninth transistor may be turned on and the initialization voltage may have a second voltage different from the first voltage in the third initialization period subsequent to the second initialization period.

In an embodiment, the second voltage may be less than the first voltage.

In an embodiment, the third transistor, the seventh transistor, the sixth transistor, the eighth transistor and the ninth transistor may be turned on and the initialization voltage may have a first voltage in a first initialization period. The third transistor may be turned off, the sixth transistor, the eighth transistor and the ninth transistor may be turned on and the initialization voltage may have a second voltage different from the first voltage in a second initialization period subsequent to the first initialization period. The third transistor and the sixth transistor may be turned off, the eighth transistor and the ninth transistor may be turned on and the initialization voltage may have a third voltage different from the first voltage and the second voltage in a third initialization period subsequent to the second initialization period.

In an embodiment, the first transistor, the second transistor, the fourth transistor and the fifth transistor may be P-type transistors. The third transistor and the sixth transistor may be N-type transistors.

In an embodiment, the pixel circuit may further include a ninth transistor configured to apply an initialization voltage to an anode electrode of the light emitting element. The ninth transistor may be an N-type transistor.

In an embodiment, the first transistor, the second transistor, the fourth transistor, the fifth transistor and the sixth transistor may be P-type transistors. The third transistor may be an N-type transistor.

In an embodiment, the pixel circuit may further include a ninth transistor configured to apply an initialization voltage to an anode electrode of the light emitting element. The ninth transistor may be an N-type transistor.

In an embodiment, the first transistor, the second transistor, the third transistor, the fourth transistor, the fifth transistor and the sixth transistor may be P-type transistors.

In an embodiment, the second transistor may include a control electrode that receives a first writing gate signal, a first electrode that receives the first data voltage and a second electrode electrically connected to the second node. The third transistor may include a control electrode that receives a second writing gate signal, a first electrode electrically connected to the first node and a second electrode electrically connected to the third node. The fifth transistor may include a control electrode that receives a third writing gate signal, a first electrode that receives the second data voltage and a second electrode electrically connected to the fifth node. The sixth transistor may include a control electrode that receives a fourth writing gate signal, a first electrode electrically connected to the fourth node and a second electrode electrically connected to the sixth node. The light emitting element may include an anode electrode and a cathode electrode that receives a third power voltage. The pixel circuit may further include a first capacitor including a first electrode that receives a sweep signal and a second electrode electrically connected to the first node, a second capacitor including a first electrode that receives a second power voltage and a second electrode electrically connected to the fourth node, a seventh transistor including a control electrode that receives a first emission signal, a first electrode that receives a first power voltage and a second electrode electrically connected to the second node, an eighth transistor including a control electrode that receives a second emission signal, a first electrode electrically connected to the third node and a second electrode electrically connected to the fourth node, a ninth transistor including a control electrode that receives the first emission signal, a first electrode that receives the second power voltage and a second electrode electrically connected to the fifth node, a tenth transistor including a control electrode that receives the second emission signal, a first electrode electrically connected to the sixth node and a second electrode electrically connected to the anode electrode and an eleventh transistor including a control electrode that receives an initialization gate signal, a first electrode that receives an initialization voltage and a second electrode electrically connected to the anode electrode.

In an embodiment, the initialization gate signal may have an active level, the first writing gate signal may have an inactive level, the third writing gate signal may have an inactive level, the second writing gate signal may have an active level, the fourth writing gate signal may have an active level, the first emission signal may have an inactive level, the second emission signal may have an active level and the sweep signal may have a first level in a first period.

In an embodiment, the initialization gate signal may have an inactive level, the first writing gate signal may have an active pulse, the third writing gate signal may have the inactive level, the second writing gate signal may have an active pulse, the fourth writing gate signal may have an inactive level, the first emission signal may have the inactive level, the second emission signal may have an inactive level and the sweep signal may have the first level in a second period subsequent to the first period.

In an embodiment, the initialization gate signal may have the inactive level, the first writing gate signal may have the inactive level, the third writing gate signal may have an active level, the second writing gate signal may have an inactive level, the fourth writing gate signal may have the active level, the first emission signal may have the inactive level, the second emission signal may have the inactive level and the sweep signal may have the first level in a third period subsequent to the second period.

In an embodiment, the initialization gate signal may have the inactive level, the first writing gate signal may have the inactive level, the third writing gate signal may have the inactive level, the second writing gate signal may have the inactive level, the fourth writing gate signal may have the inactive level, the first emission signal may have an active level, the second emission signal may have an active level and the sweep signal may gradually decrease from the first level in a fourth period subsequent to the third period.

In an embodiment, the first power voltage may be greater than the second power voltage.

In an embodiment, a first electrode of the second transistor may be electrically connected to a data voltage terminal. A first electrode of the fifth transistor may be electrically connected to the data voltage terminal.

In an embodiment, a first electrode of the second transistor may be electrically connected to a first data voltage terminal. A first electrode of the fifth transistor may be electrically connected to a second data voltage terminal different from the first data voltage terminal.

In an embodiment of a display apparatus according to the inventive concept, the display apparatus may include a display panel, a gate driver and a data driver. The display panel includes a pixel circuit. The gate driver may be configured to output a gate signal to the pixel circuit. The data driver may be configured to output a data voltage to the pixel circuit. The pixel circuit includes a first transistor including a control electrode electrically connected to a first node, a first electrode electrically connected to a second node and a second electrode electrically connected to a third node, a second transistor configured to apply a first data voltage to the first transistor, a third transistor electrically connected to the first node and the third node, a fourth transistor including a control electrode electrically connected to a fourth node, a first electrode electrically connected to a fifth node and a second electrode electrically connected to a sixth node, a fifth transistor configured to apply a second data voltage to the fourth transistor, an sixth transistor electrically connected to the fourth node and the sixth node and a light emitting element that emits light based on the first data voltage and the second data voltage.

According to the pixel circuit and the display apparatus including the pixel circuit, the pixel circuit may include eleven transistors and two capacitors. The pixel circuit may be driven according to the pulse width modulation technique, operate the internal compensation of the threshold voltage and include the relatively fewer transistors compared to the earlier pixel circuit, so that the high integration may be achieved. Thus, the pixel circuit may be applicable to an ultra-high resolution display apparatus.

In a timing diagram of the pixel circuit, the control electrode of the first transistor, the control electrode of the sixth transistor and the anode electrode of the light emitting element may be initialized in the initialization period so that the number of the transistors for the initialization may decrease and the time for initialization may be reduced.

BRIEF DESCRIPTION OF THE DRAWINGS

The above and other features and advantages of the inventive concept will become more apparent by describing in detailed embodiments thereof with reference to the accompanying drawings, in which.

DETAILED DESCRIPTION OF THE EMBODIMENTS

Figure 1:
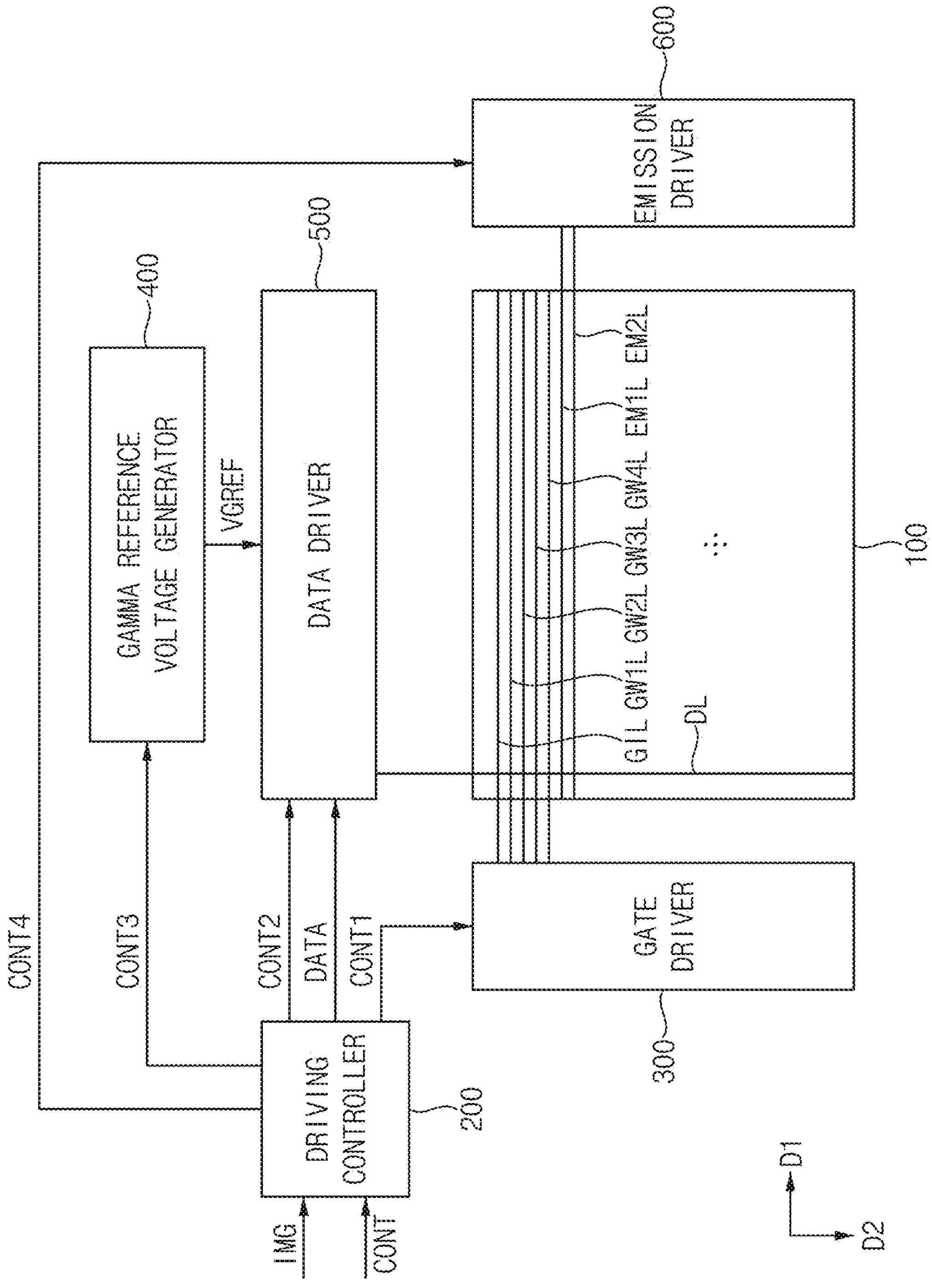
FIG. 1 is a schematic block diagram illustrating a display apparatus according to an embodiment of the inventive concept.

In the following description, for the purposes of explanation, numerous specific details are set forth in order to provide a thorough understanding of various embodiments or implementations of the disclosure. As used herein "embodiments" and "implementations" are interchangeable words that are non-limiting examples of devices or methods disclosed herein. It is apparent, however, that various embodiments may be practiced without these specific details or with one or more equivalent arrangements. Here, various embodiments do not have to be exclusive nor limit the disclosure. For example, specific shapes, configurations, and characteristics of an embodiment may be used or implemented in another embodiment.

Unless otherwise specified, the illustrated embodiments are to be understood as providing features of the disclosure. Therefore, unless otherwise specified, the features, components, modules, layers, films, panels, regions, and/or aspects, etc. (hereinafter individually or collectively referred to as "elements"), of the various embodiments may be otherwise combined, separated, interchanged, and/or rearranged without departing from the inventive concepts.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified. Further, in the accompanying drawings, the size and relative sizes of elements may be exaggerated for clarity and/or descriptive purposes. When an embodiment may be implemented differently, a specific process order may be performed differently from the described order. For example, two consecutively described processes may be performed substantially at the same time or performed in an order opposite to the described order. Also, like reference numerals and/or reference characters denote like elements.

When an element, such as a layer, is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. To this end, the term "connected" may refer to physical, electrical, and/or fluid connection, with or without intervening elements. Further, the X-axis, the Y-axis, and the Z-axis are not limited to three axes of a rectangular coordinate system, such as the x, y, and z axes, and may be interpreted in a broader sense. For example, the X-axis, the Y-axis, and the Z-axis may be perpendicular to one another, or may represent different directions that are not perpendicular to one another.

For the purposes of this disclosure, "at least one of A and B" may be construed as A only, B only, or any combination of A and B. Also, "at least one of X, Y, and Z" and "at least one selected from the group consisting of X, Y, and Z" may be construed as X only, Y only, Z only, or any combination of two or more of X, Y, and Z. As used herein, the term "and/or" includes any and all combinations of one or more of the associated listed items.

Although the terms "first," "second," etc. may be used herein to describe various types of elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one elements relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

Various embodiments are described herein with reference to sectional and/or exploded illustrations that are schematic illustrations of embodiments and/or intermediate structures. As such, variations from the shapes of the illustrations as a result, for example, of manufacturing techniques and/or tolerances, are to be expected. Thus, embodiments disclosed herein should not necessarily be construed as limited to the particular illustrated shapes of regions, but are to include deviations in shapes that result from, for instance, manufacturing. In this manner, regions illustrated in the drawings may be schematic in nature and the shapes of these regions may not reflect actual shapes of regions of a device and, as such, are not necessarily intended to be limiting.

As customary in the field, some embodiments are described and illustrated in the accompanying drawings in terms of functional blocks, units, and/or modules. Those skilled in the art will appreciate that these blocks, units, and/or modules are physically implemented by electronic (or optical) circuits, such as logic circuits, discrete components, microprocessors, hard-wired circuits, memory elements, wiring connections, and the like, which may be formed using semiconductor-based fabrication techniques or other manufacturing technologies. In the case of the blocks, units, and/or modules being implemented by microprocessors or other similar hardware, they may be programmed and controlled using software (e.g., microcode) to perform various functions discussed herein and may optionally be driven by firmware and/or software. It is also contemplated that each block, unit, and/or module may be implemented by dedicated hardware, or as a combination of dedicated hardware to perform some functions and a processor (e.g., one or more programmed microprocessors and associated circuitry) to perform other functions. Also, each block, unit, and/or module of some embodiments may be physically separated into two or more interacting and discrete blocks, units, and/or modules without departing from the scope of the inventive concepts. Further, the blocks, units, and/or modules of some embodiments may be physically combined into more complex blocks, units, and/or modules without departing from the scope of the inventive concepts.

Unless otherwise defined or implied herein, all terms (including technical and scientific terms) used herein have the same meaning as commonly understood by those skilled in the art to which this disclosure pertains. It will be further understood that terms, such as those defined in commonly used dictionaries, should be interpreted as having a meaning that is consistent with their meaning in the context of the relevant art and the disclosure, and should not be interpreted in an ideal or excessively formal sense unless clearly so defined herein.

Hereinafter, the inventive concept will be explained in detail with reference to the accompanying drawings.

FIG. 1 is a schematic block diagram illustrating a display apparatus according to an embodiment of the inventive concept.

Referring to FIG. 1, the display apparatus includes a display panel 100 and a display panel driver. The display panel driver includes a driving controller 200, a gate driver 300, a gamma reference voltage generator 400, a data driver 500 and an emission driver 600.

The display panel 100 has a display region on which an image may be displayed and a peripheral region adjacent to the display region.

The display panel 100 includes multiple gate lines GIL, GW1L, GW2L, GW3L and GW4L, multiple data lines DL, multiple emission lines EM1L and EM2L and multiple pixels electrically connected to the gate lines GIL, GW1L, GW2L, GW3L and GW4L, the data lines DL and the emission lines EM1L and EM2L. The gate lines GIL, GW1L, GW2L, GW3L and GW4L may extend in a first direction D1, the data lines DL may extend in a second direction D2 intersecting the first direction D1 and the emission lines EM1L and EM2L may extend in the first direction D1.

The driving controller 200 receives input image data IMG and an input control signal CONT from an external apparatus. For example, the input image data IMG may include red image data, green image data and blue image data. The input image data IMG may include white image data. The input image data IMG may include magenta image data, cyan image data and yellow image data. The input control signal CONT may include a master clock signal and a data enable signal. The input control signal CONT may further include a vertical synchronizing signal and a horizontal synchronizing signal.

The driving controller 200 generates a first control signal CONT1, a second control signal CONT2, a third control signal CONT3, a fourth control signal CONT4 and a data signal DATA based on the input image data IMG and the input control signal CONT.

The driving controller 200 generates the first control signal CONT1 for controlling an operation of the gate driver 300 based on the input control signal CONT, and outputs the first control signal CONT1 to the gate driver 300. The first control signal CONT1 may include a vertical start signal and a gate clock signal.

The driving controller 200 generates the second control signal CONT2 for controlling an operation of the data driver 500 based on the input control signal CONT, and outputs the second control signal CONT2 to the data driver 500. The second control signal CONT2 may include a horizontal start signal and a load signal.

The driving controller 200 generates the data signal DATA based on the input image data IMG. The driving controller 200 outputs the data signal DATA to the data driver 500.

The driving controller 200 generates the third control signal CONT3 for controlling an operation of the gamma reference voltage generator 400 based on the input control signal CONT, and outputs the third control signal CONT3 to the gamma reference voltage generator 400.

The driving controller 200 generates the fourth control signal CONT4 for controlling an operation of the emission driver 600 based on the input control signal CONT, and outputs the fourth control signal CONT4 to the emission driver 600.

The gate driver 300 generates gate signals driving the gate lines GIL, GW1L, GW2L, GW3L and GW4L in response to the first control signal CONT1 received from the driving controller 200. The gate driver 300 may output the gate signals to the gate lines GIL, GW1L, GW2L, GW3L and GW4L. The gate signals may include a data initialization gate signal, a first writing gate signal, a second writing gate signal, a third writing gate signal and a fourth writing gate signal. Although the gate driver 300 may be illustrated as a single element in FIG. 1, the inventive concept may not be limited thereto. The gate signals may be outputted from plural gate driving circuits respectively.

In an embodiment of the inventive concept, the gate driver 300 may be integrated on the peripheral region of the display panel 100. In an embodiment of the inventive concept, the gate driver 300 may be mounted on the peripheral region of the display panel 100.

The gamma reference voltage generator 400 generates a gamma reference voltage VGREF in response to the third control signal CONT3 received from the driving controller 200. The gamma reference voltage generator 400 provides the gamma reference voltage VGREF to the data driver 500. The gamma reference voltage VGREF has a value corresponding to a level of the data signal DATA.

In an embodiment, the gamma reference voltage generator 400 may be disposed in the driving controller 200, or in the data driver 500.

The data driver 500 receives the second control signal CONT2 and the data signal DATA from the driving controller 200, and receives the gamma reference voltages VGREF from the gamma reference voltage generator 400. The data driver 500 converts the data signal DATA into data voltages having an analog type using the gamma reference voltages VGREF. The data driver 500 outputs the data voltages to the data lines DL.

In an embodiment of the inventive concept, the data driver 500 may be integrated on the peripheral region of the display panel 100. In an embodiment of the inventive concept, the data driver 500 may be mounted on the peripheral region of the display panel 100.

The emission driver 600 generates emission signals to drive the emission lines EM1L and EM2L in response to the fourth control signal CONT4 received from the driving controller 200. The emission driver 600 may output the emission signals to the emission lines EM1L and EM2L. The emission signals may include a first emission signal and a second emission signal.

In an embodiment of the inventive concept, the emission driver 600 may be integrated on the peripheral region of the display panel 100. In an embodiment of the inventive concept, the emission driver 600 may be mounted on the peripheral region of the display panel 100.

Although the gate driver 300 may be illustrated to be disposed at a first side of the display panel 100 and the emission driver 600 may be illustrated to be disposed at a second side of the display panel 100 opposite to the first side in FIG. 1 for convenience of explanation, the inventive concept may not be limited thereto. For example, both of the gate driver 300 and the emission driver 600 may be disposed at the first side of the display panel 100. For example, both of the gate driver 300 and the emission driver 600 may be disposed at both sides of the display panel 100. For example, the gate driver 300 and the emission driver 600 may be integral with each other.

Figure 2:
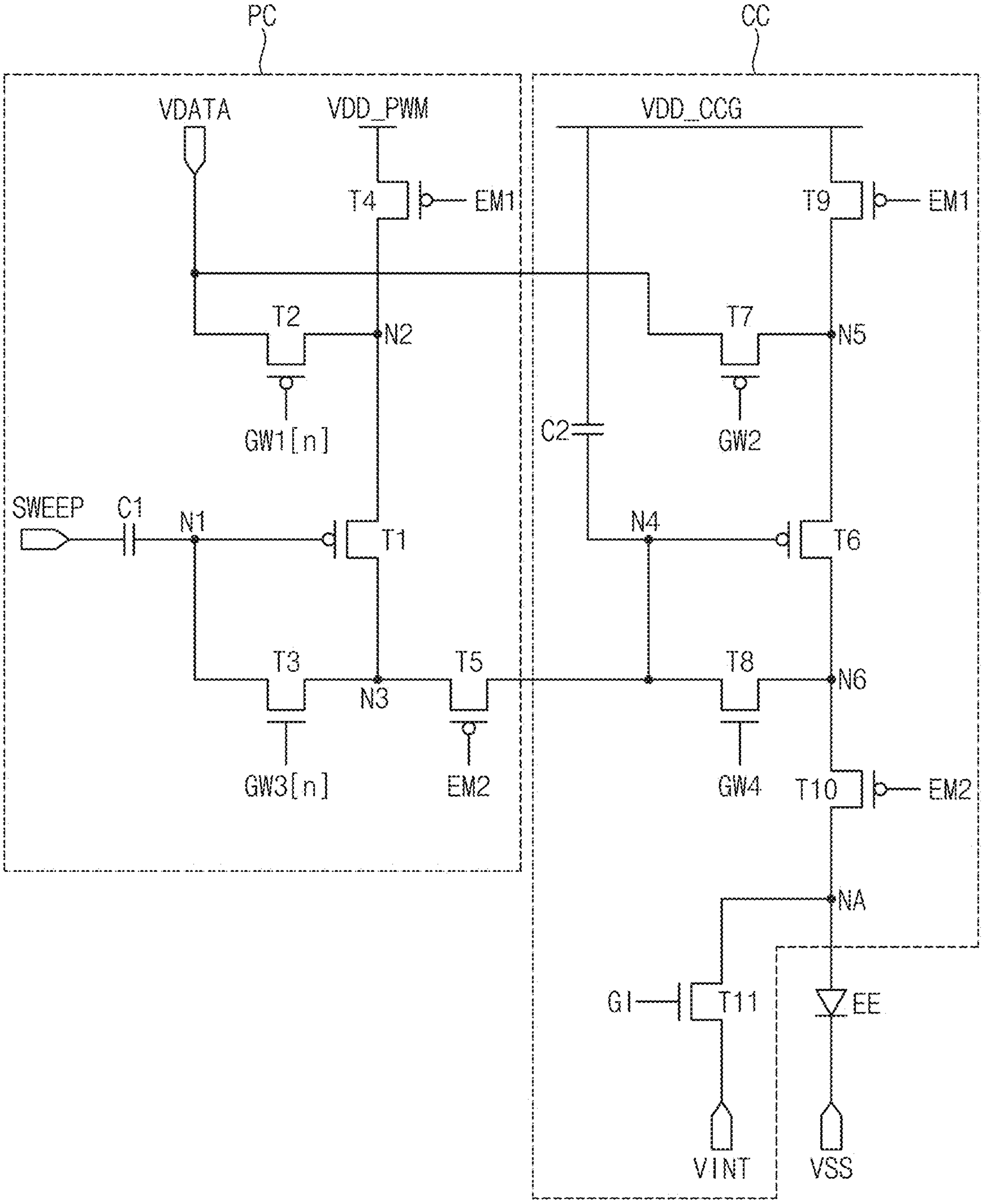
FIG. 2 is a schematic diagram of an equivalent circuit of a pixel of the display panel of FIG. 1.
Figure 3:
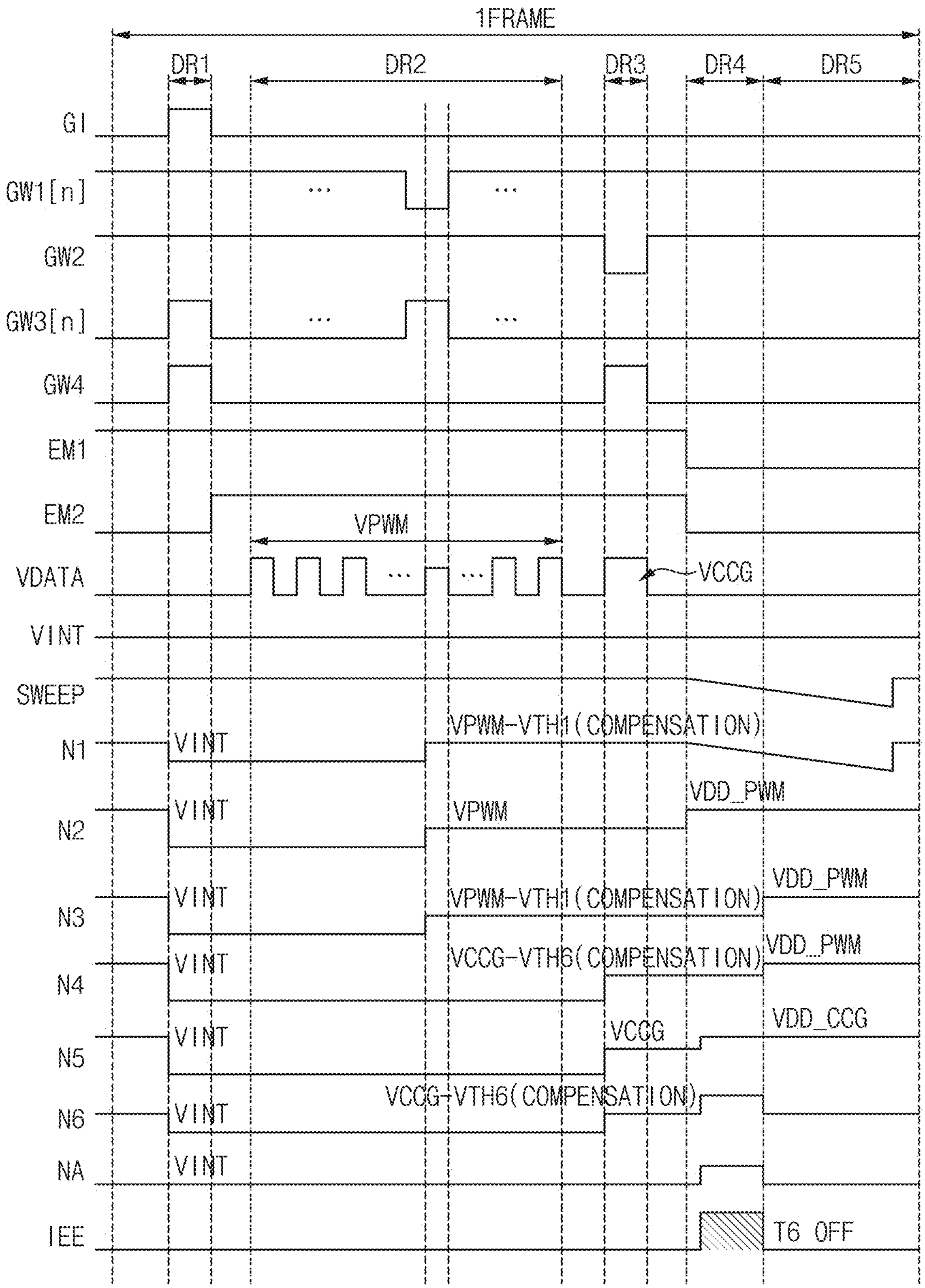
FIG. 3 is a schematic timing diagram illustrating an example of input signals applied to the pixel circuit of FIG. 2 and node signals of the pixel circuit of FIG. 2.

FIG. 2 is a schematic diagram of an equivalent circuit of a pixel of the display panel 100 of FIG. 1. FIG. 3 is a schematic timing diagram illustrating an example of input signals applied to the pixel circuit of FIG. 2 and node signals of the pixel circuit of FIG. 2.

Referring to FIGS. 1 to 3, the pixel circuit includes a first circuit PC, a second circuit CC and a light emitting element EE.

The first circuit PC may be a pulse width modulation circuit for a pulse width modulation (PWM). The second circuit CC may be a constant current generation circuit for a constant current generation (CCG).

The first circuit PC may include first to fifth transistors T1, T2, T3, T4 and T5 and a first capacitor C1. The second circuit CC may include sixth to eleventh T6, T7, T8, T9, T10 and T11 and a second capacitor C2.

For example, the light emitting element EE may be a light emitting diode. In an embodiment, the light emitting element EE may be a micro light emitting diode.

The pixel circuit may include a first transistor T1 including a control electrode electrically connected to a first node N1, a first electrode electrically connected to a second node N2 and a second electrode electrically connected to a third node N3, a second transistor T2 applying a first data voltage VPWM to the first transistor T1, a third transistor T3 connecting the first node N1 and the third node N3, a sixth transistor T6 including a control electrode electrically connected to a fourth node N4, a first electrode electrically connected to a fifth node N5 and a second electrode electrically connected to a sixth node N6, a seventh transistor T7 applying a second data voltage VCCG to the sixth transistor T6, an eighth transistor T8 connecting the fourth node N4 and the sixth node N6 and the light emitting element EE that emits light based on the first data voltage VPWM and the second data voltage VCCG.

The second transistor T2 may include a control electrode receiving a first writing gate signal GW1[*n*], a first electrode receiving the first data voltage VPWM and a second electrode electrically connected to the second node.

The third transistor T3 may include a control electrode receiving a third writing gate signal GW3[*n*], a first electrode electrically connected to the first node N1 and a second electrode electrically connected to the third node N3.

The seventh transistor T7 may include a control electrode receiving a second writing gate signal GW2, a first electrode receiving the second data voltage VCCG and a second electrode electrically connected to the fifth node N5.

The eighth transistor T8 may include a control electrode receiving a fourth writing gate signal GW4, a first electrode electrically connected to the fourth node N4 and a second electrode electrically connected to the sixth node N6.

The light emitting element EE may include an anode electrode and a cathode electrode. The cathode electrode may receive a third power voltage VSS.

The pixel circuit may further include a first capacitor including a first electrode receiving a sweep signal SWEEP and a second electrode electrically connected to the first node N1, a second capacitor including a first electrode receiving a second power voltage VDD_CCG and a second electrode electrically connected to the fourth node N4, a fourth transistor T4 including a control electrode receiving a first emission signal EM1, a first electrode receiving a first power voltage VDD_PWM and a second electrode electrically connected to the second node N2, a fifth transistor T5 including a control electrode receiving a second emission signal EM2, a first electrode electrically connected to the third node N3 and a second electrode electrically connected to the fourth node N4, a ninth transistor T9 including a control electrode receiving the first emission signal EM1, a first electrode receiving the second power voltage VDD_CCG and a second electrode electrically connected to the fifth node N5, a tenth transistor T10 including a control electrode receiving the second emission signal EM2, a first electrode electrically connected to the sixth node N6 and a second electrode electrically connected to the anode electrode NA and an eleventh transistor T11 including a control electrode receiving an initialization gate signal GI, a first electrode receiving an initialization voltage VINT and a second electrode electrically connected to the anode electrode NA.

As explained above, the pixel circuit may include eleven transistors and two capacitors.

In the embodiment, the first electrode of the second transistor T2 may be electrically connected to a data voltage terminal VDATA. The first electrode of the seventh transistor T7 may be electrically connected to the data voltage terminal VDATA. The first data voltage VPWM applied to the first electrode of the second transistor T2 and the second data voltage VCCG applied to the first electrode of the seventh transistor T7 may be outputted from the same voltage terminal so that the pixel circuit may be simplified and the number of voltage lines may decrease. The first data voltage VPMW may have the same or different voltage levels according to a light emitting intensity of each pixel. The second data voltage VCCG may have the same voltage level for all of the pixels. The second data voltage VCCG may have a first voltage level for a red pixel, the second data voltage, a second voltage level different from the first voltage level for a green pixel and a third voltage level different from the first voltage level and the second voltage level for a blue pixel.

For example, the first power voltage VDD_PWM and the second power voltage VDD_CCG may be high power voltages for determining a light emitting degree of the light emitting element EE. For example, the third power voltage VSS may be a low power voltage for determining the light emitting degree of the light emitting element EE. The first power voltage VDD_PWM and the second power voltage VDD_CCG may be greater than the third power voltage VSS.

The first power voltage VDD_PWM may be greater than the second power voltage VDD_CCG. In case that the sixth transistor T6 is turned on, the light emitting element EE may emit light. In case that the first transistor T1 is turned on, the first power voltage VDD_PWM is applied to the control electrode of the sixth transistor T6. In case that the first power voltage VDD_PWM is applied to the control electrode of the sixth transistor T6, the sixth transistor T6 may be turned off so that the light emitting element EE stops emitting the light.

In case that the first power voltage VDD_PWM is greater than the second power voltage VDD_CCG and the first power voltage VDD_PWM may be applied to the control electrode of the sixth transistor T6, the sixth transistor T6 may be maintained in a turned-off state more reliably.

For example, the initialization voltage VINT may initialize the anode electrode NA, the control electrode of the first transistor T1 and the control electrode of the sixth transistor T6.

In case that the initialization voltage VINT is applied to the anode electrode NA, the light emitting element EE may be turned off. In case that the initialization voltage VINT is applied to the control electrode of the first transistor T1, the first transistor T1 may be turned on. In case that the initialization voltage VINT is applied to the control electrode of the sixth transistor T6, the sixth transistor T6 may be turned on.

The first writing gate signal GW1[*n*] and the third writing gate signal GW3[*n*] may be progressive scan signals having different timings for pixel rows. Herein, [n] means an n-th pixel row. The pixel circuit of FIG. 2 receiving the first writing gate signal GW1[*n*] and the third writing gate signal GW3[*n*] may be included in the n-th pixel row.

The initialization gate signal GI, the second writing gate signal GW2 and the fourth writing gate signal GW4 may be global scan signals having the same timing regardless of the pixel rows. The first emission signal EM1 and the second emission signal EM2 may be global scan signals having the same timing regardless of the pixel rows.

A first pulse of the third writing gate signal GW3[*n*] may be a global scan pulse having the same timing regardless of the pixel row and a second pulse of the third writing gate signal GW3[*n*] may be a progressive scan pulse having a different timing according to the pixel row.

The fifth transistor T5 may be electrically connected to the third node N3 and the fourth node N4. The tenth transistor T10 may be electrically connected to the sixth node N6 and the anode electrode NA of the light emitting element EE. The eleventh transistor T11 may apply the initialization voltage VINT to the anode electrode NA.

In the embodiment, some of the transistors in the pixel circuit may be P-type transistors and some of the transistors in the pixel circuit may be N-type transistors. For example, the P-type transistor may be a low temperature polycrystalline silicon (LTPS) transistor. For example, the N-type transistor may be an oxide semiconductor transistor.

In the embodiment, the first transistor T1, the second transistor T2, the sixth transistor T6 and the seventh transistor T7 may be P-type transistors. In contrast, the third transistor T3 and the eighth transistor T8 may be N-type transistors.

In case that the third transistor T3 is an N-type transistor, a current leakage of the third transistor T3 may be reduced so that the level of the first data voltage VPWM applied to the control electrode of the first transistor T1 may be reliably maintained.

Similarly, in case that the eighth transistor T8 is an N-type transistor, a current leakage of the eighth transistor T8 may be reduced so that the level of the second data voltage VCCG applied to the control electrode of the sixth transistor T6 may be reliably maintained.

The eleventh transistor T11 may be an N-type transistor. In case that the eleventh transistor T11 is an N-type transistor, the initialization performance of the anode electrode NA may be enhanced.

The fourth transistor T4, the fifth transistor T5, the ninth transistor T9 and the tenth transistor T10 may be P-type transistors.

In the timing diagram of FIG. 3, a first period DR1 may be an initialization period, a second period DR2 may be a pulse width modulation data writing and compensation period, a third period DR3 may be a constant current generation data writing and compensation period, a fourth period DR4 may be a light emission period and a fifth period DR5 may be a light emission off period.

A width of the fourth period DR4 which may be the light emission period may be determined by a level of the pulse width modulation data VPWM.

The sweep signal SWEEP may have a uniform level in the first period DR1, the second period DR2 and the third period DR3. The sweep signal SWEEP may gradually decrease in the fourth period DR4 and the fifth period DR5.

Figure 4:
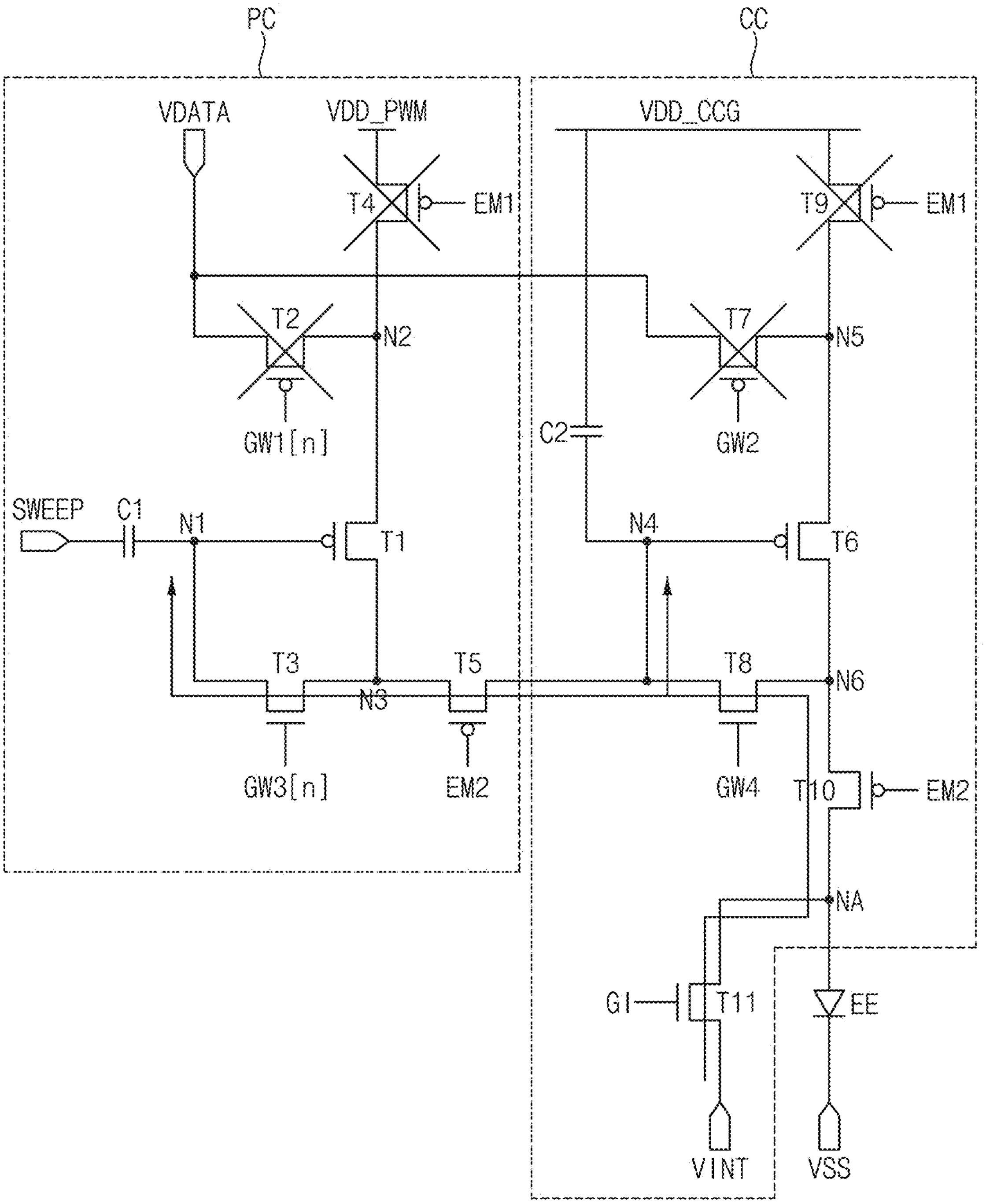
FIG. 4 is a schematic diagram of an equivalent circuit of a pixel of FIG. 2 in a first period of a timing diagram.
Figure 5:
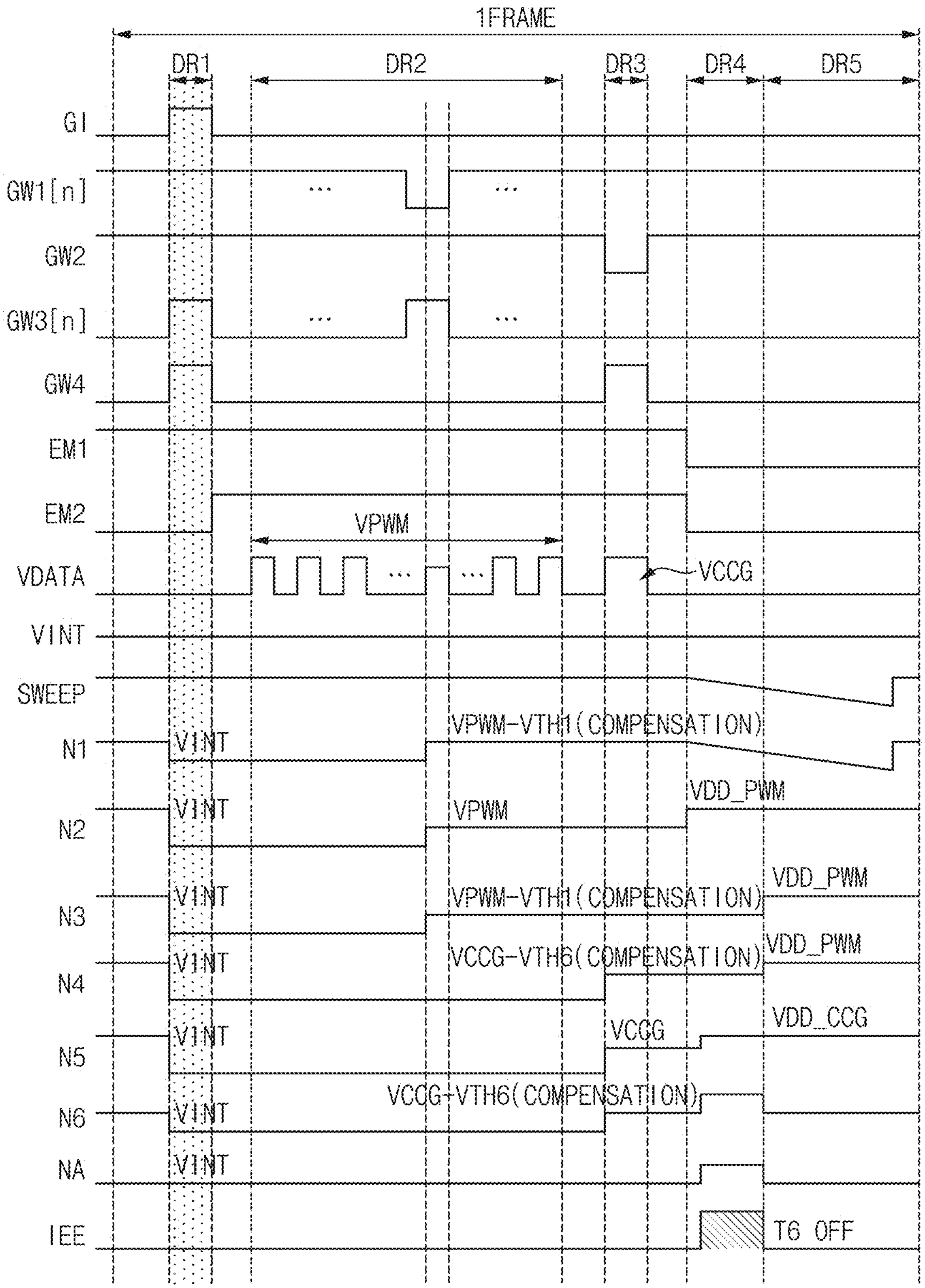
FIG. 5 is a schematic timing diagram illustrating an example of input signals applied to the pixel circuit of FIG. 2 and node signals of the pixel circuit of FIG. 2 in the first period.
Figure 6:
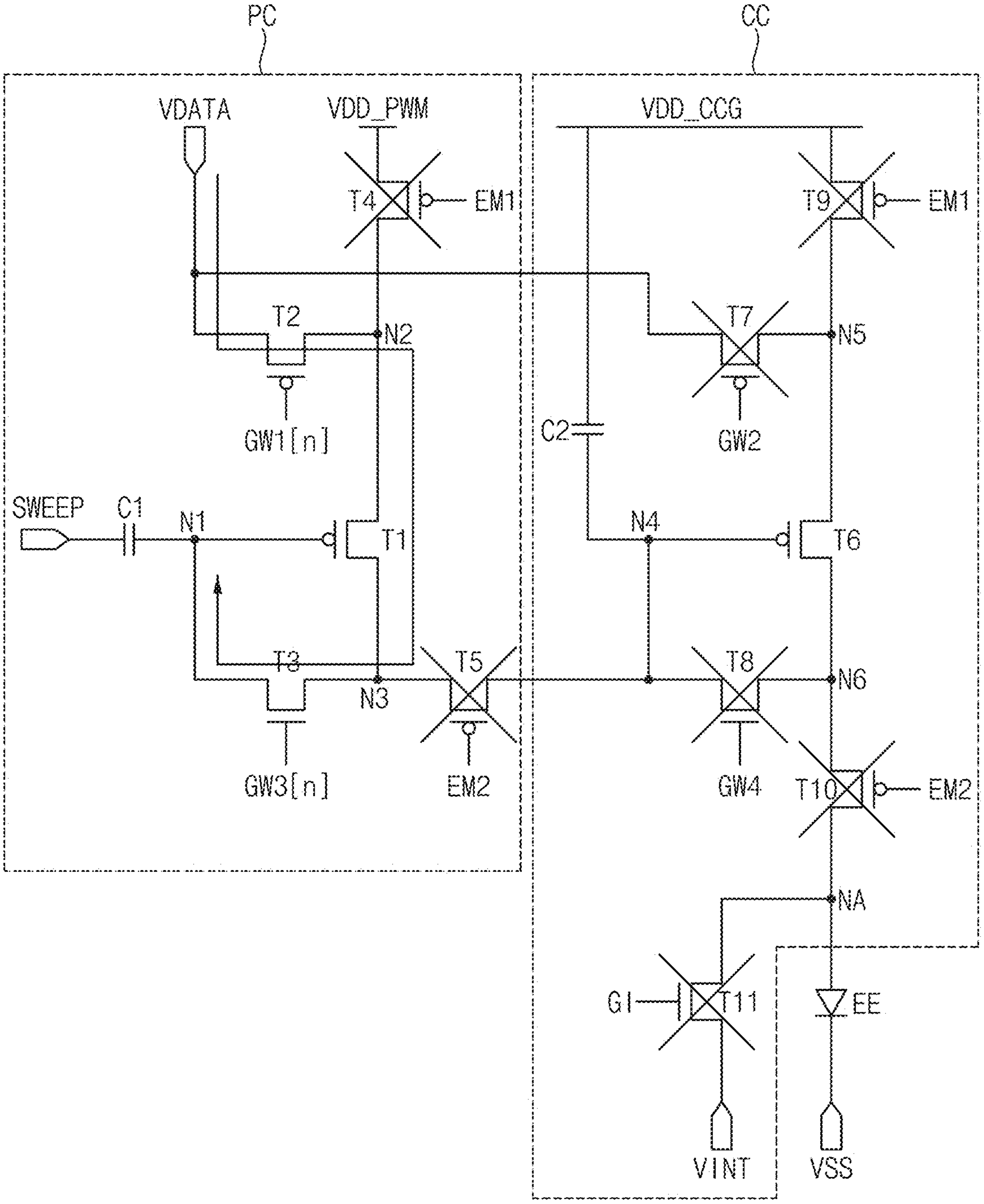
FIG. 6 is a schematic diagram of an equivalent circuit of a pixel of FIG. 2 in a second period of the timing diagram.
Figure 7:
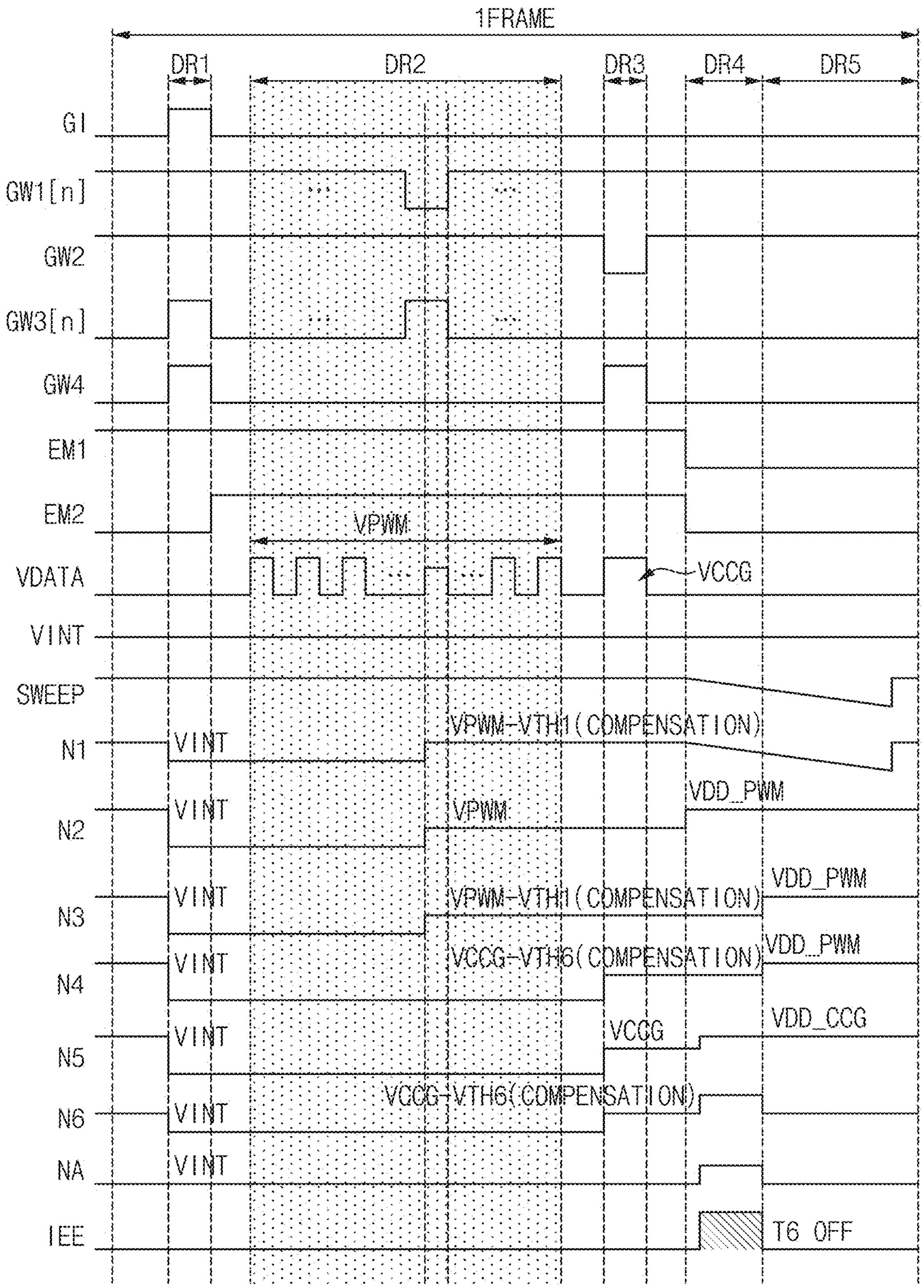
FIG. 7 is a schematic timing diagram illustrating an example of input signals applied to the pixel circuit of FIG. 2 and node signals of the pixel circuit of FIG. 2 in the second period.
Figure 8:
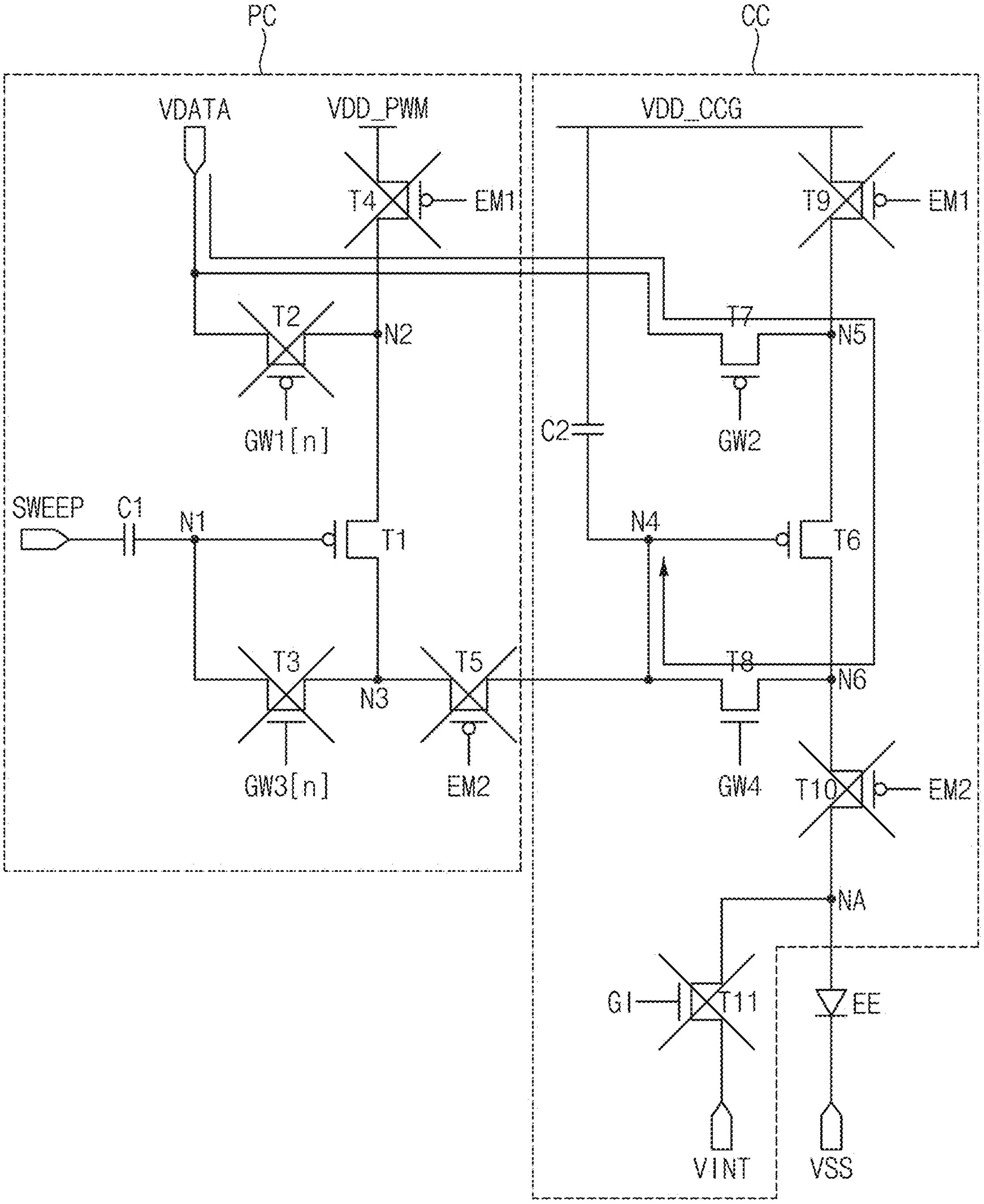
FIG. 8 is a schematic diagram of an equivalent circuit of a pixel of FIG. 2 in a third period of the timing diagram.
Figure 9:
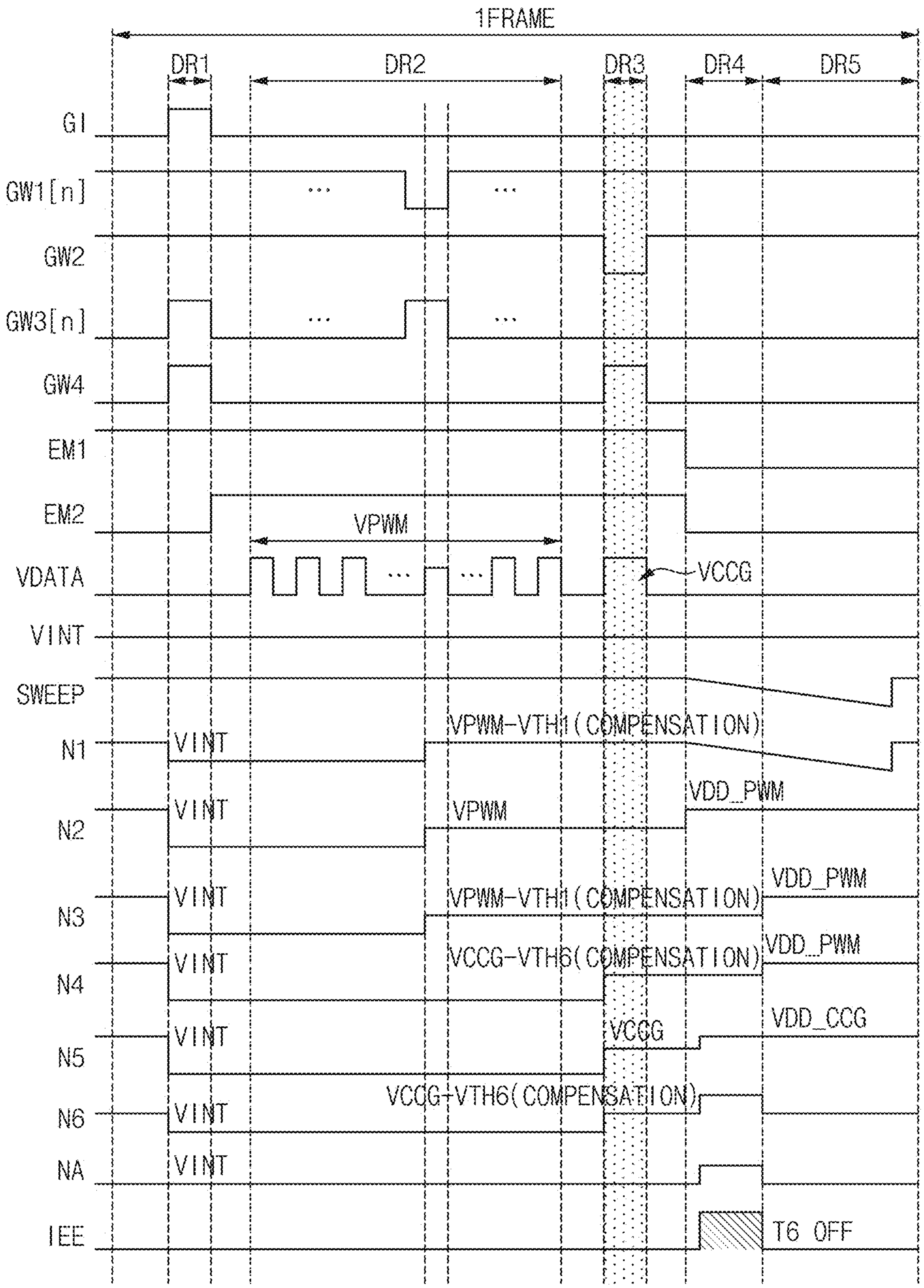
FIG. 9 is a schematic timing diagram illustrating an example of input signals applied to the pixel circuit of FIG. 2 and node signals of the pixel circuit of FIG. 2 in the third period.
Figure 10:
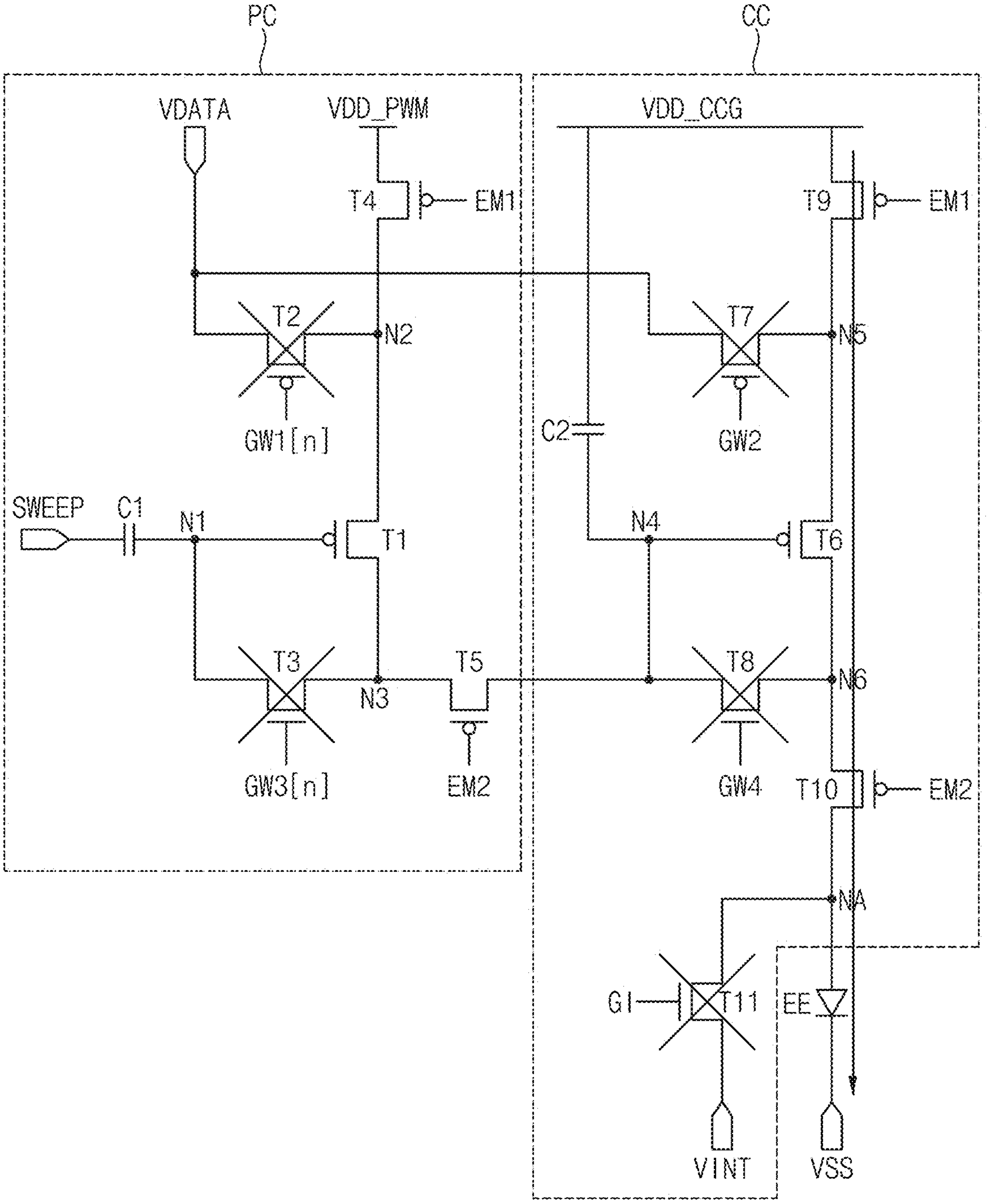
FIG. 10 is a schematic diagram of an equivalent circuit of a pixel of FIG. 2 in a fourth period of the timing diagram.
Figure 11:
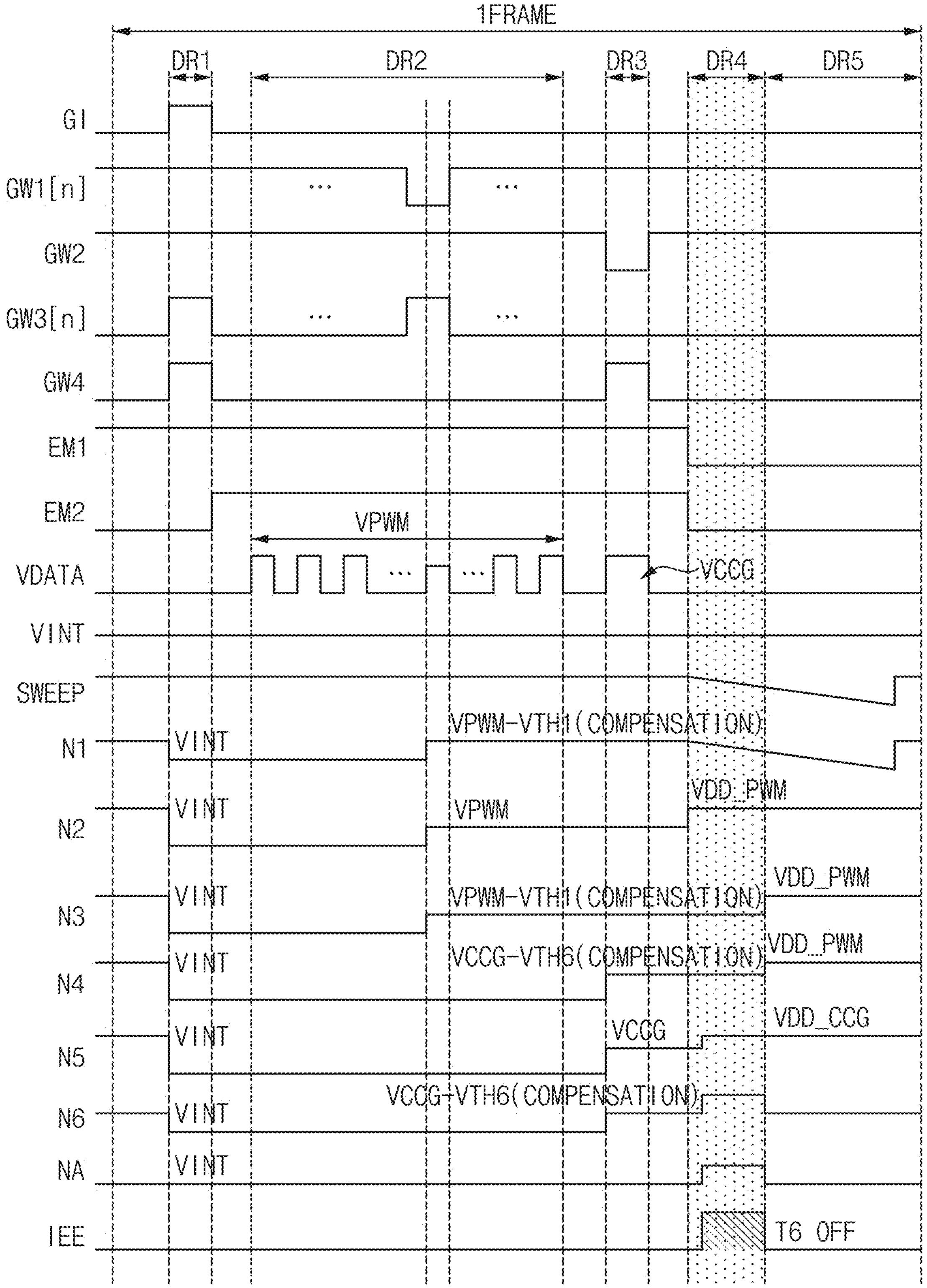
FIG. 11 is a schematic timing diagram illustrating an example of input signals applied to the pixel circuit of FIG. 2 and node signals of the pixel circuit of FIG. 2 in the fourth period.
Figure 12:
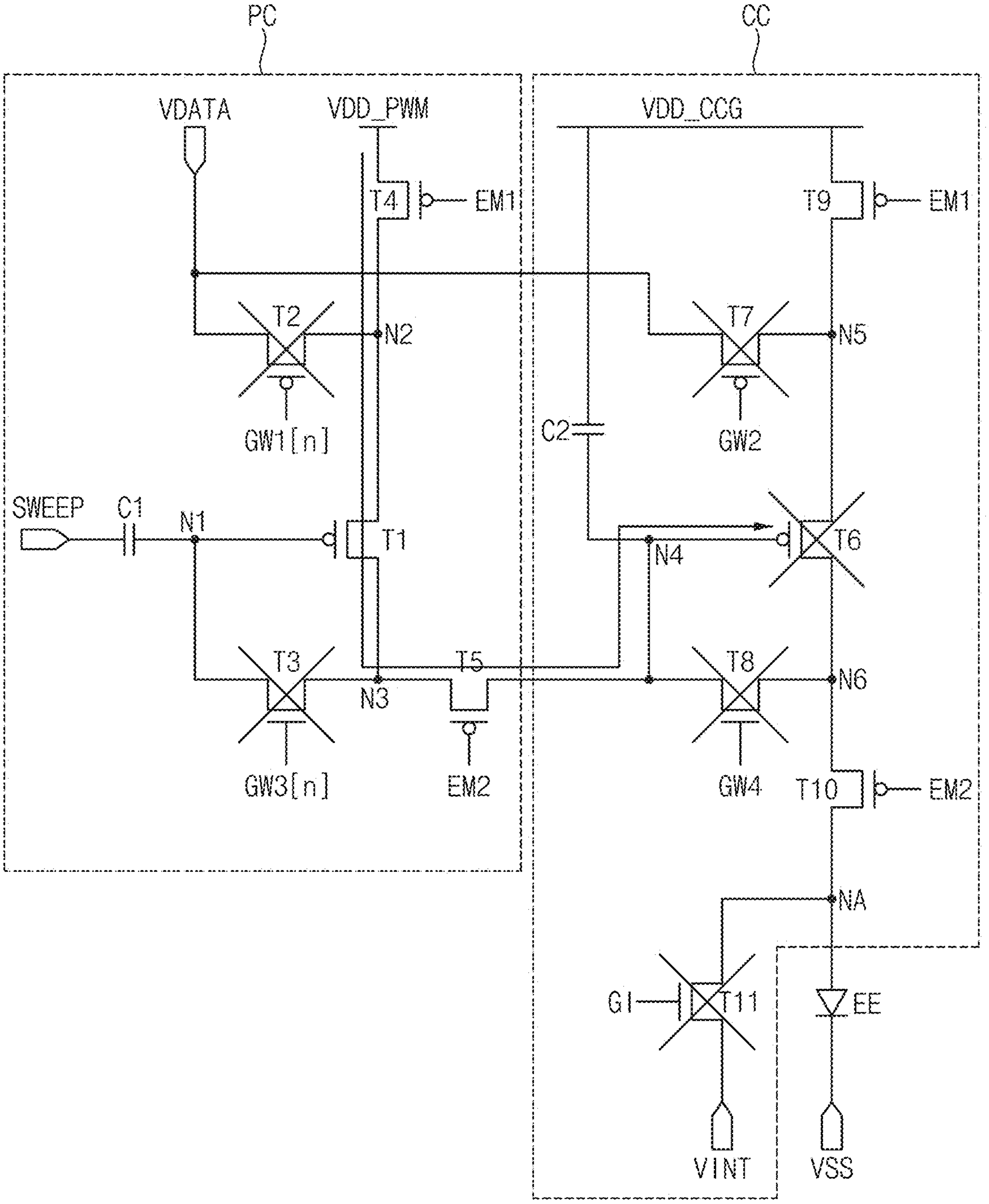
FIG. 12 is a schematic diagram of an equivalent circuit of a pixel of FIG. 2 in a fifth period of the timing diagram.
Figure 13:
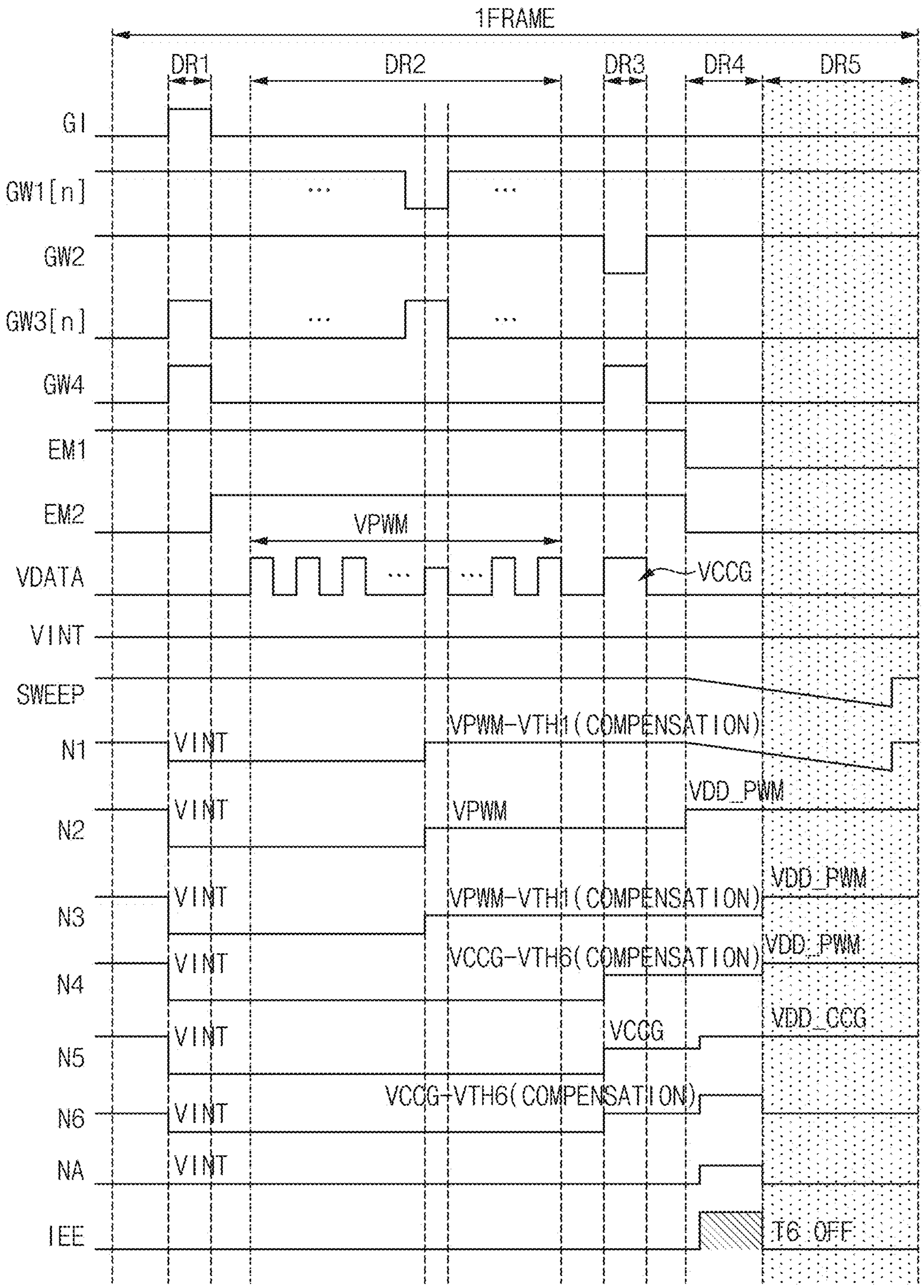
FIG. 13 is a schematic timing diagram illustrating an example of input signals applied to the pixel circuit of FIG. 2 and node signals of the pixel circuit of FIG. 2 in the fifth period.

FIG. 4 is a schematic diagram of an equivalent circuit of a pixel of FIG. 2 in the first period DR1 of a timing diagram. FIG. 5 is a schematic timing diagram illustrating an example of input signals applied to the pixel circuit of FIG. 2 and node signals of the pixel circuit of FIG. 2 in the first period DR1. FIG. 6 is a schematic diagram of an equivalent circuit of a pixel of FIG. 2 in the second period DR2 of the timing diagram. FIG. 7 is a schematic timing diagram illustrating an example of input signals applied to the pixel circuit of FIG. 2 and node signals of the pixel circuit of FIG. 2 in the second period DR2. FIG. 8 is a schematic diagram of an equivalent circuit of a pixel of FIG. 2 in the third period DR3 of the timing diagram. FIG. 9 is a schematic timing diagram illustrating an example of input signals applied to the pixel circuit of FIG. 2 and node signals of the pixel circuit of FIG. 2 in the third period DR3. FIG. 10 is a schematic diagram of an equivalent circuit of a pixel of FIG. 2 in the fourth period DR4 of the timing diagram. FIG. 11 is a schematic timing diagram illustrating an example of input signals applied to the pixel circuit of FIG. 2 and node signals of the pixel circuit of FIG. 2 in the fourth period DR4. FIG. 12 is a schematic diagram of an equivalent circuit of a pixel of FIG. 2 in the fifth period DR5 of the timing diagram. FIG. 13 is a schematic timing diagram illustrating an example of input signals applied to the pixel circuit of FIG. 2 and node signals of the pixel circuit of FIG. 2 in the fifth period DR5.

Referring to FIGS. 4 and 5, in the first period DR1, the initialization gate signal GI may have an active level, the first writing gate signal GW1[*n*] may have an inactive level, the second writing gate signal GW2 may have an inactive level, the third writing gate signal GW3[*n*] may have an active level, the fourth writing gate signal GW4 may have an active level, the first emission signal EM1 may have an inactive level, the second emission signal EM2 may have an active level and the sweep signal SWEEP may have a first level which may be a fixed level.

Herein, in case that the transistor receiving the initialization gate signal GI, the first writing gate signal GW1[*n*], the second writing gate signal GW2, the third writing gate signal GW3[*n*], the fourth writing gate signal GW4, the first emission signal EM1 and the second emission signal EM2 may be a P-type transistor, the active level may be a low level and the inactive level may be a high level. In contrast, in case that the transistor receiving the initialization gate signal GI, the first writing gate signal GW1[*n*], the second writing gate signal GW2, the third writing gate signal GW3[*n*], the fourth writing gate signal GW4, the first emission signal EM1 and the second emission signal EM2 may be an N-type transistor, the active level may be a high level and the inactive level may be a low level.

The first period DR1 may be an initialization period. In the initialization period DR1, the third transistor T3, the fifth transistor T5, the eighth transistor T8, the tenth transistor T10 and the eleventh transistor T11 may be turned on.

The anode electrode NA may be initialized to the initialization voltage VINT through the eleventh transistor T11. The control electrode N4 of the sixth transistor T6 may be initialized to the initialization voltage VINT through a path of the eleventh transistor T11, the tenth transistor T10 and the eighth transistor T8. The control electrode N1 of the first transistor T1 may be initialized to the initialization voltage VINT through a path of the eleventh transistor T11, the tenth transistor T10, the eighth transistor T8, the fifth transistor T5 and the third transistor T3.

Referring to FIGS. 6 and 7, in the second period DR2 subsequent to the first period DR1, the initialization gate signal GI may have an inactive level, the first writing gate signal GW1[*n*] may have an active pulse, the second writing gate signal GW2 may have the inactive level, the third writing gate signal GW3[*n*] may have an active pulse, the fourth writing gate signal GW4 may have an inactive level, the first emission signal EM1 may have the inactive level, the second emission signal EM2 may have an inactive level and the sweep signal SWEEP may have the first level.

The second period DR2 may be a pulse width modulation data writing and compensation period. In the pulse width modulation data writing and compensation period DR2, the second transistor T2 may be turned on by the first writing gate signal GW1[*n*], the first transistor T1 may be turned on by the initialization voltage VINT from the initialization period DR1 and the third transistor T3 may be turned on by the third writing gate signal GW3[*n*].

In the pulse width modulation data writing and compensation period DR2, the first data voltage VPWM may be applied to the control electrode of the first transistor T1 through a path of the second transistor T2, the first transistor T1 and the third transistor T3. The threshold voltage VTH1 of the first transistor T1 may be compensated in the first data voltage VPWM by the third transistor T3 which may be diode-connected.

Referring to FIGS. 8 and 9, in the third period DR3 subsequent to the second period DR2, the initialization gate signal GI may have the inactive level, the first writing gate signal GW1[*n*] may have the inactive level, the second writing gate signal GW2 may have an active level, the third writing gate signal GW3[*n*] may have an inactive level, the fourth writing gate signal GW4 may have the active level, the first emission signal EM1 may have the inactive level, the second emission signal EM2 may have an inactive level and the sweep signal SWEEP may have the first level.

The third period DR3 may be a constant current generation data writing and compensation period. In the constant current generation data writing and compensation period DR3, the seventh transistor T7 may be turned on by the second writing gate signal GW2, the sixth transistor T6 may be turned on by the initialization voltage VINT from the initialization period DR1 and the eighth transistor T8 may be turned on by the fourth writing gate signal GW4.

In the constant current generation data writing and compensation period DR3, the second data voltage VCCG may be applied to the control electrode of the sixth transistor T6 through a path of the seventh transistor T7, the sixth transistor T6 and the eighth transistor T8. The threshold voltage VTH6 of the sixth transistor T6 may be compensated in the second data voltage VCCG by the eighth transistor T8 which may be diode-connected.

Referring to FIGS. 10 and 11, in the fourth period DR4 subsequent to the third period DR3, the initialization gate signal GI may have the inactive level, the first writing gate signal GW1[*n*] may have the inactive level, the second writing gate signal GW2 may have the inactive level, the third writing gate signal GW3[*n*] may have the inactive level, the fourth writing gate signal GW4 may have the inactive level, the first emission signal EM1 may have an active level, the second emission signal EM2 may have the active level and the sweep signal SWEEP may gradually decrease from the first level.

The fourth period DR4 may be a light emission period. In the light emission period DR4, the ninth transistor T9 may be turned on by the first emission signal EM1, the sixth transistor T6 may be turned on by the second data voltage VCCG and the tenth transistor T10 may be turned on by the second emission signal EM2.

In the light emission period DR4, a current IEE may flow through a path of the ninth transistor T9, the sixth transistor T6, the tenth transistor T10 and the light emitting element EE so that the light emitting element EE may emit light.

Referring to FIGS. 12 and 13, in the fifth period DR5 subsequent to the fourth period DR4, the initialization gate signal GI may have the inactive level, the first writing gate signal GW1[*n*] may have the inactive level, the second writing gate signal GW2 may have the inactive level, the third writing gate signal GW3[*n*] may have the inactive level, the fourth writing gate signal GW4 may have the inactive level, the first emission signal EM1 may have the active level, the second emission signal EM2 may have the active level and the sweep signal SWEEP may gradually decrease.

The fifth period DR5 may be the light emission off period. As the sweep signal SWEEP decreases, the first transistor T1 may be turned on at a specific time point. The turn-on time point may be determined by the first data voltage VPWM applied to the control electrode of the first transistor T1.

In case that the first transistor T1 is turned on, the first power voltage VDD_PWM may be applied to the control electrode of the sixth transistor T6 along a path of the fourth transistor T4, the first transistor T1 and the fifth transistor T5.

In case that the first power voltage VDD_PWM is applied to the control electrode of the sixth transistor T6, the sixth transistor T6 is turned off so that the light emitting current IEE stops so that the light emitting element EE stops emitting light.

According to the embodiment, the pixel circuit may include eleven transistors and two capacitors. The pixel circuit may be driven according to the pulse width modulation technique, operate the internal compensation of the threshold voltage and include the relatively fewer transistors compared to the earlier pixel circuit, so that the high integration may be achieved. Thus, the pixel circuit may be applicable to an ultra-high resolution display apparatus.

In the timing diagram of the pixel circuit, the control electrode of the first transistor T1, the control electrode of the sixth transistor T6 and the anode electrode NA of the light emitting element EE may be initialized in the initialization period DR1 so that the number of the transistors for the initialization may decrease and the time for initialization may be reduced.

Figure 14:
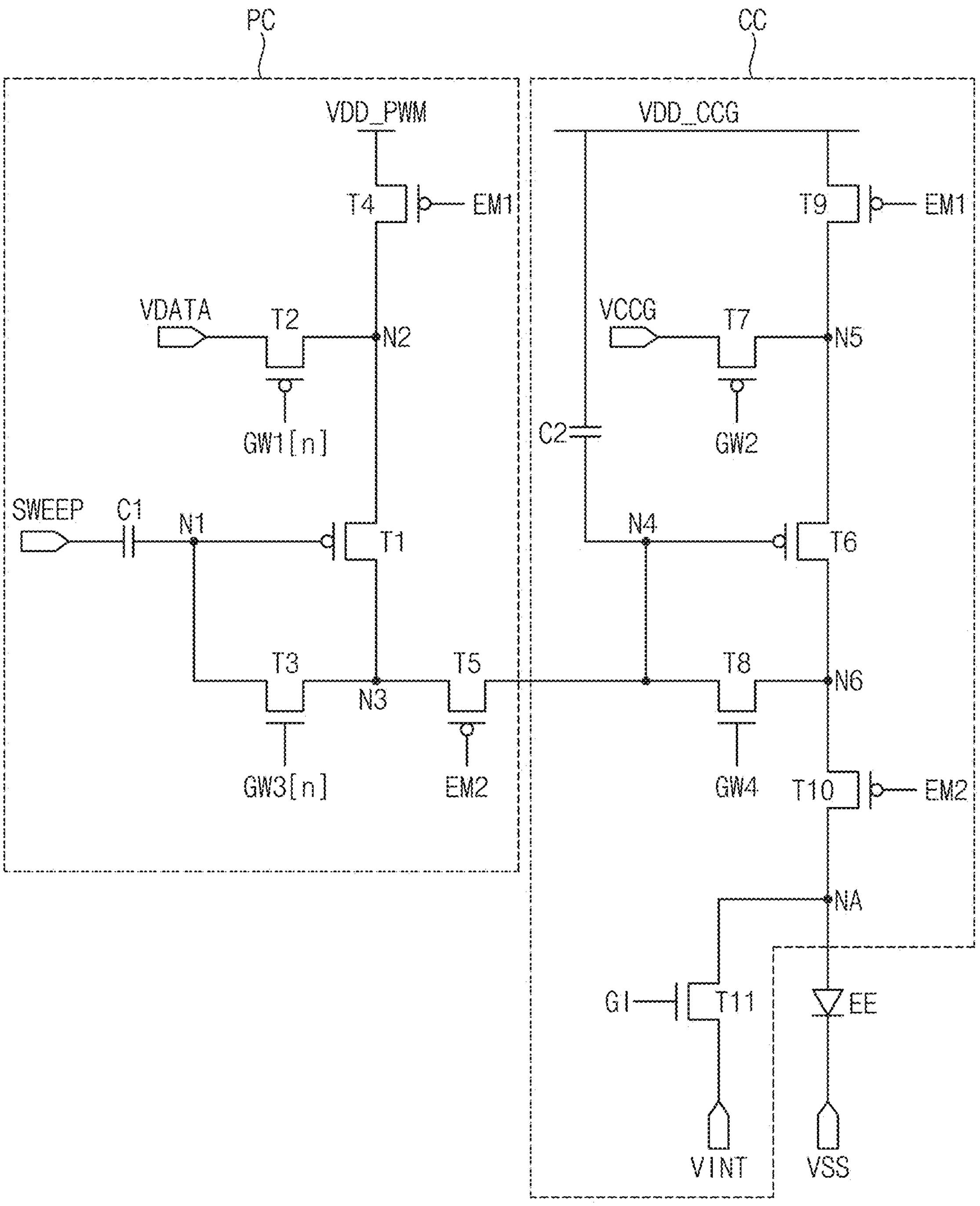
FIG. 14 is a schematic diagram of an equivalent circuit of a pixel of a display panel of a display apparatus according to an embodiment of the inventive concept.

FIG. 14 is a schematic diagram of an equivalent circuit of a pixel of a display panel 100 of a display apparatus according to an embodiment of the inventive concept.

The pixel circuit according to the embodiment may be substantially the same as the pixel circuit of the previous embodiment explained referring to FIG. 2 except that a first data voltage terminal applying a first data voltage and a second data voltage terminal applying a second data voltage may be separated. Thus, the same reference numerals will be used to refer to the same or like parts as those described in the previous embodiment and any repetitive explanation concerning the above elements will be omitted.

Referring to FIGS. 1 and 3 to 14, the pixel circuit includes a first transistor T1 including a control electrode electrically connected to a first node N1, a first electrode electrically connected to a second node N2 and a second electrode electrically connected to a third node N3, a second transistor T2 applying a first data voltage VPMW to the first transistor T1, a third transistor T3 electrically connected to the first node N1 and the third node N3, a sixth transistor T6 including a control electrode electrically connected to a fourth node N4, a first electrode electrically connected to a fifth node N5 and a second electrode electrically connected to a sixth node N6, a seventh transistor T7 applying a second data voltage VCCG to the sixth transistor T6, an eighth transistor T8 electrically connected to the fourth node N4 and the sixth node N6 and a light emitting element EE emitting a light based on the first data voltage VPWM and the second data voltage VCCG.

In the embodiment, a first electrode of the second transistor T2 may be electrically connected to a first data voltage terminal VDATA. A first electrode of the seventh transistor T7 may be electrically connected to a second data voltage terminal VCCG different from the first data voltage terminal VDATA.

The data voltage terminal applying the first data voltage VPWM and the data voltage terminal applying the second data voltage VCCG may be separated so that a load of an amplifier of the data driver 500 and the power consumption of the data driver 500 may be reduced.

According to the embodiment, the pixel circuit may include eleven transistors and two capacitors. The pixel circuit may be driven according to the pulse width modulation technique, operate the internal compensation of the threshold voltage and include the relatively fewer transistors compared to the earlier pixel circuit, so that the high integration may be achieved. Thus, the pixel circuit may be applicable to an ultra-high resolution display apparatus.

In the timing diagram of the pixel circuit, the control electrode of the first transistor T1, the control electrode of the sixth transistor T6 and the anode electrode NA of the light emitting element EE may be initialized in the initialization period DR1 so that the number of the transistors for the initialization may decrease and the time for initialization may be reduced.

Figure 15:
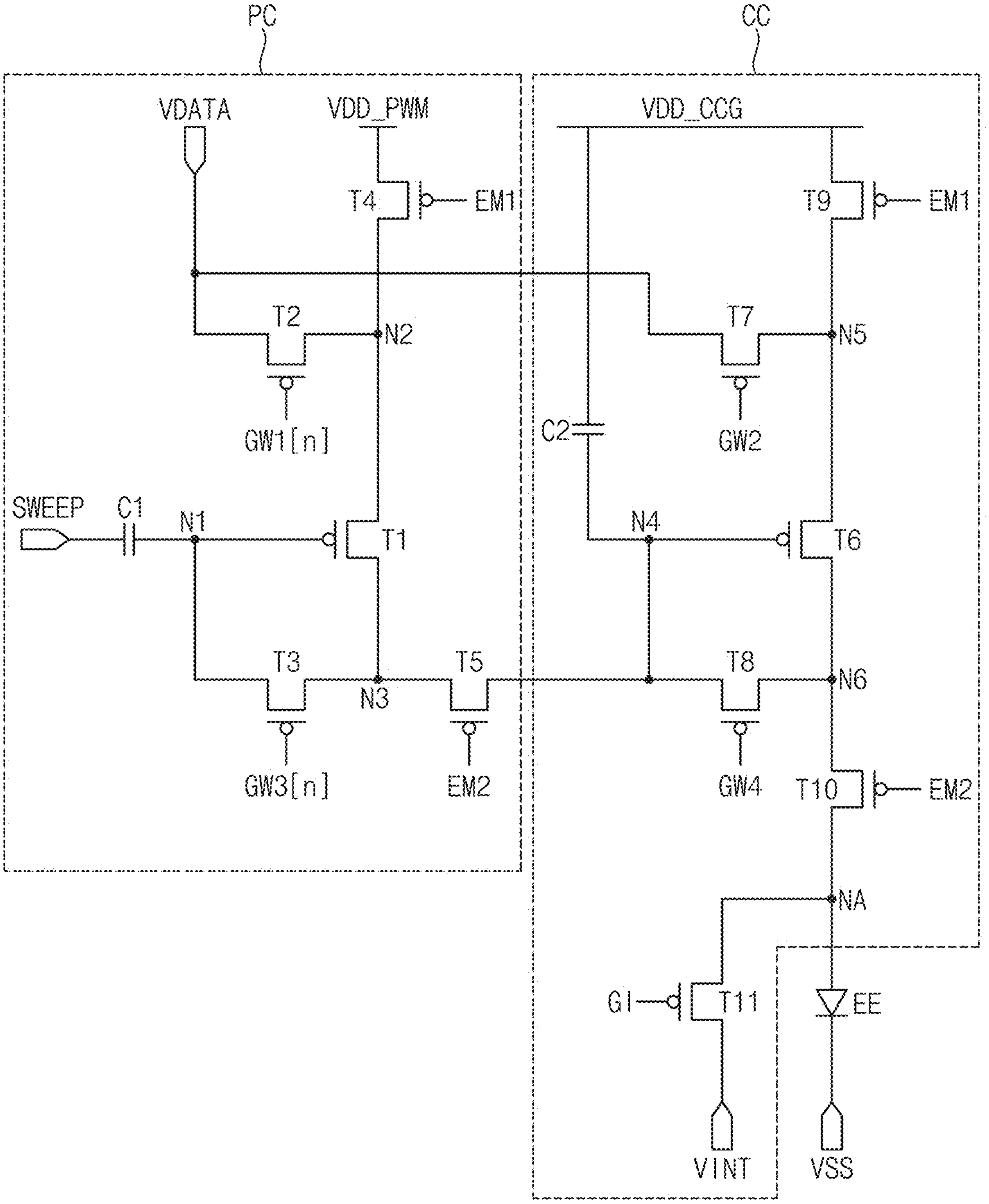
FIG. 15 is a schematic diagram of an equivalent circuit of a pixel of a display panel of a display apparatus according to an embodiment of the inventive concept.

FIG. 15 is a schematic diagram of an equivalent circuit of a pixel of a display panel 100 of a display apparatus according to an embodiment of the inventive concept.

The pixel circuit according to the embodiment may be substantially the same as the pixel circuit of the previous embodiment explained referring to FIG. 2 except that the third transistor T3, the eighth transistor T8 and the eleventh transistor T11 may be P-type transistors. The timing diagram of the signals applied to the pixel circuit according to the embodiment may be substantially the same as the schematic timing diagram of FIG. 3 except that the active levels and the inactive levels of the control signals of the third transistor T3, the eighth transistor T8 and the eleventh transistor T11 may be inverted from the active levels and the inactive levels of the control signals of the third transistor T3, the eighth transistor T8 and the eleventh transistor T11 of FIG. 3. Thus, the same reference numerals will be used to refer to the same or like parts as those described in the previous embodiment and any repetitive explanation concerning the above elements will be omitted.

Referring to FIGS. 1 and 3 to 13 and 15, the pixel circuit includes a first transistor T1 including a control electrode electrically connected to a first node N1, a first electrode electrically connected to a second node N2 and a second electrode electrically connected to a third node N3, a second transistor T2 applying a first data voltage VPMW to the first transistor T1, a third transistor T3 electrically connected to the first node N1 and the third node N3, a sixth transistor T6 including a control electrode electrically connected to a fourth node N4, a first electrode electrically connected to a fifth node N5 and a second electrode electrically connected to a sixth node N6, a seventh transistor T7 applying a second data voltage VCCG to the sixth transistor T6, an eighth transistor T8 electrically connected to the fourth node N4 and the sixth node N6 and a light emitting element EE emitting a light based on the first data voltage VPWM and the second data voltage VCCG.

In the embodiment, the first transistor T1, the second transistor T2, the third transistor T3, the sixth transistor T6, the seventh transistor and the eighth transistor T8 may be P-type transistors. The eleventh transistor T11 may be a P-type transistor. The fourth transistor T4, the fifth transistor T5, the ninth transistor T9 and the tenth transistor T10 may be P-type transistors.

As explained above, for example, in the embodiment, all of the transistors in the pixel circuit may be P-type transistors. In case that all of the transistors in the pixel circuit are P-type transistors, a manufacturing process may be simplified and a manufacturing cost may be reduced.

According to the embodiment, the pixel circuit may include eleven transistors and two capacitors. The pixel circuit may be driven according to the pulse width modulation technique, operate the internal compensation of the threshold voltage and include the relatively fewer transistors compared to the earlier pixel circuit, so that the high integration may be achieved. Thus, the pixel circuit may be applicable to an ultra-high resolution display apparatus.

In the timing diagram of the pixel circuit, the control electrode of the first transistor T1, the control electrode of the sixth transistor T6 and the anode electrode NA of the light emitting element EE may be initialized in the initialization period DR1 so that the number of the transistors for the initialization may decrease and the time for initialization may be reduced.

Figure 16:
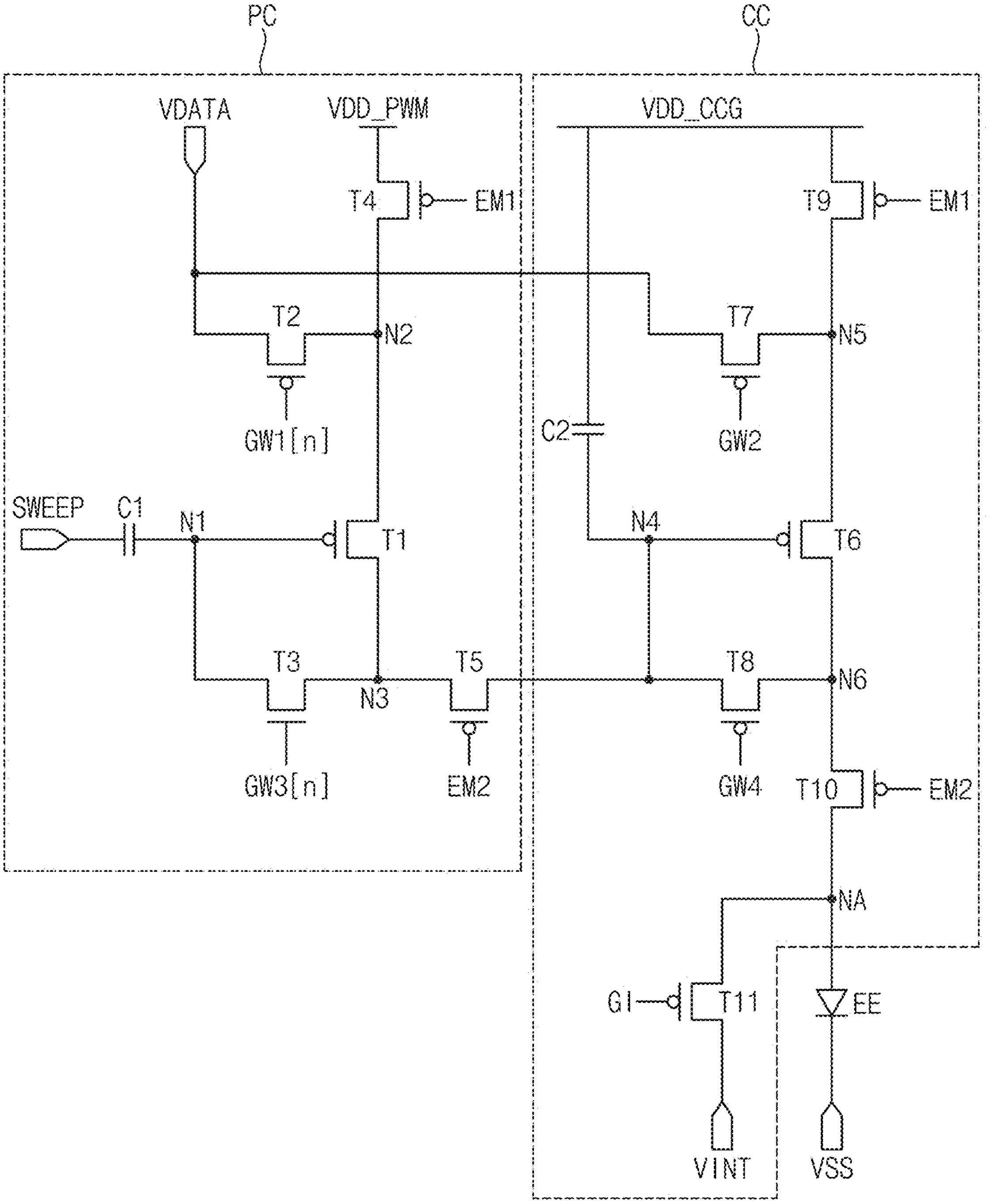
FIG. 16 is a schematic diagram of an equivalent circuit of a pixel of a display panel of a display apparatus according to an embodiment of the inventive concept.

FIG. 16 is a schematic diagram of an equivalent circuit of a pixel of a display panel 100 of a display apparatus according to an embodiment of the inventive concept.

The pixel circuit according to the embodiment may be substantially the same as the pixel circuit of the previous embodiment explained referring to FIG. 2 except that the eighth transistor T8 and the eleventh transistor T11 may be P-type transistors. The timing diagram of the signals applied to the pixel circuit according to the embodiment may be substantially the same as the timing diagram of FIG. 3 except that the active levels and the inactive levels of the control signals of the eighth transistor T8 and the eleventh transistor T11 may be inverted from the active levels and the inactive levels of the control signals of the eighth transistor T8 and the eleventh transistor T11 of FIG. 3. Thus, the same reference numerals will be used to refer to the same or like parts as those described in the previous embodiment and any repetitive explanation concerning the above elements will be omitted.

Referring to FIGS. 1 and 3 to 13 and 16, the pixel circuit includes a first transistor T1 including a control electrode electrically connected to a first node N1, a first electrode electrically connected to a second node N2 and a second electrode electrically connected to a third node N3, a second transistor T2 applying a first data voltage VPMW to the first transistor T1, a third transistor T3 electrically connected to the first node N1 and the third node N3, a sixth transistor T6 including a control electrode electrically connected to a fourth node N4, a first electrode electrically connected to a fifth node N5 and a second electrode electrically connected to a sixth node N6, a seventh transistor T7 applying a second data voltage VCCG to the sixth transistor T6, an eighth transistor T8 electrically connected to the fourth node N4 and the sixth node N6 and a light emitting element EE that emits light based on the first data voltage VPWM and the second data voltage VCCG.

In the embodiment, some of the transistors in the pixel circuit may be P-type transistors and some of the transistors in the pixel circuit may be N-type transistors. For example, the P-type transistor may be a low temperature polycrystalline silicon (LTPS) transistor. For example, the N-type transistor may be an oxide semiconductor transistor.

In the embodiment, the first transistor T1, the second transistor T2, the sixth transistor T6, the seventh transistor T7 and the eighth transistor T8 may be P-type transistors. The eleventh transistor T11 may be a P-type transistor. The fourth transistor T4, the fifth transistor T5, the ninth transistor T9 and the tenth transistor T10 may be P-type transistors.

In contrast, the third transistor T3 may be an N-type transistor.

As explained above, for example, in the embodiment, almost all of the transistors in the pixel circuit may be P-type transistors. In case that almost all of the transistors in the pixel circuit are P-type transistors, a manufacturing cost may be reduced.

In case that the third transistor T3 is an N-type transistor, a current leakage of the third transistor T3 may be reduced so that a level of the first data voltage VPWM applied to the control electrode of the first transistor T1 may be well maintained.

According to the embodiment, the pixel circuit may include eleven transistors and two capacitors. The pixel circuit may be driven according to the pulse width modulation technique, operate the internal compensation of the threshold voltage and include the relatively fewer transistors compared to the earlier pixel circuit, so that the high integration may be achieved. Thus, the pixel circuit may be applicable to an ultra-high resolution display apparatus.

In the timing diagram of the pixel circuit, the control electrode of the first transistor T1, the control electrode of the sixth transistor T6 and the anode electrode NA of the light emitting element EE may be initialized in the initialization period DR1 so that the number of the transistors for the initialization may decrease and the time for initialization may be reduced.

Figure 17:
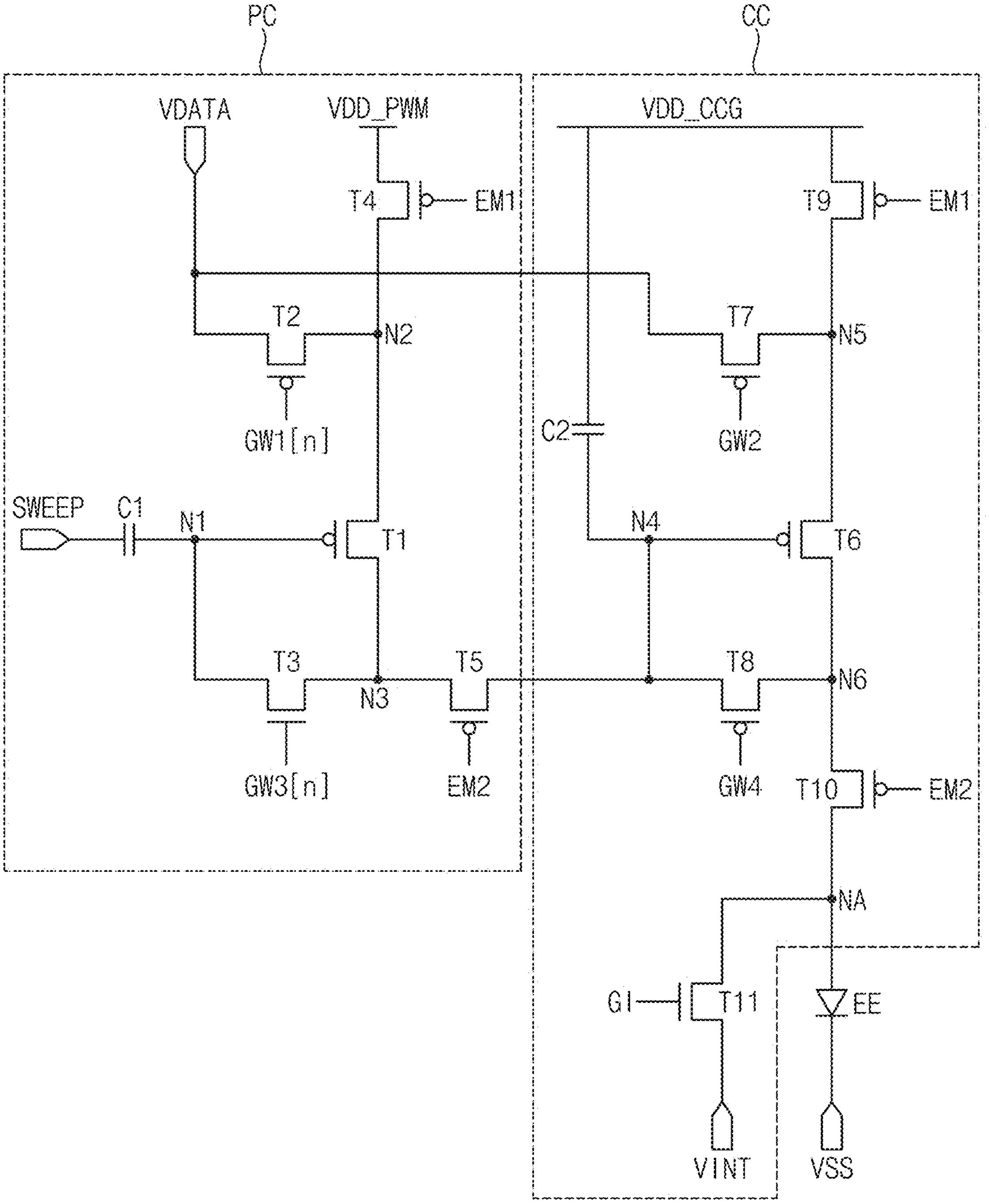
FIG. 17 is a schematic diagram of an equivalent circuit of a pixel of a display panel of a display apparatus according to an embodiment of the inventive concept.

FIG. 17 is a schematic diagram of an equivalent circuit of a pixel of a display panel of a display apparatus according to an embodiment of the inventive concept.

The pixel circuit according to the embodiment may be substantially the same as the pixel circuit of the previous embodiment explained referring to FIG. 2 except that the eighth transistor T8 may be a P-type transistor. The timing diagram of the signals applied to the pixel circuit according to the embodiment may be substantially the same as the timing diagram of FIG. 3 except that the active level and the inactive level of the control signal of the eighth transistor T8 may be inverted from the active level and the inactive level of the control signal of the eighth transistor T8 of FIG. 3. Thus, the same reference numerals will be used to refer to the same or like parts as those described in the previous embodiment and any repetitive explanation concerning the above elements will be omitted.

Referring to FIGS. 1 and 3 to 13 and 17, the pixel circuit includes a first transistor T1 including a control electrode electrically connected to a first node N1, a first electrode electrically connected to a second node N2 and a second electrode electrically connected to a third node N3, a second transistor T2 applying a first data voltage VPMW to the first transistor T1, a third transistor T3 electrically connected to the first node N1 and the third node N3, a sixth transistor T6 including a control electrode electrically connected to a fourth node N4, a first electrode electrically connected to a fifth node N5 and a second electrode electrically connected to a sixth node N6, a seventh transistor T7 applying a second data voltage VCCG to the sixth transistor T6, an eighth transistor T8 electrically connected to the fourth node N4 and the sixth node N6 and a light emitting element EE that emits light based on the first data voltage VPWM and the second data voltage VCCG.

In the embodiment, some of the transistors in the pixel circuit may be P-type transistors and some of the transistors in the pixel circuit may be N-type transistors. For example, the P-type transistor may be a low temperature polycrystalline silicon (LTPS) transistor. For example, the N-type transistor may be an oxide semiconductor transistor.

In the embodiment, the first transistor T1, the second transistor T2, the sixth transistor T6, the seventh transistor T7 and the eighth transistor T8 may be P-type transistors. The fourth transistor T4, the fifth transistor T5, the ninth transistor T9 and the tenth transistor T10 may be P-type transistors.

In contrast, the third transistor T3 may be an N-type transistor. The eleventh transistor T11 may be an N-type transistor.

As explained above, for example, in the embodiment, almost all of the transistors in the pixel circuit may be P-type transistors. In case that almost all of the transistors in the pixel circuit are P-type transistors, a manufacturing cost may be reduced.

In case that the third transistor T3 is an N-type transistor, a current leakage of the third transistor T3 may be reduced so that a level of the first data voltage VPWM applied to the control electrode of the first transistor T1 may be well maintained.

In case that the eleventh transistor T11 is an N-type transistor, a performance of an initialization of the anode electrode NA may be improved.

According to the embodiment, the pixel circuit may include eleven transistors and two capacitors. The pixel circuit may be driven according to the pulse width modulation technique, operate the internal compensation of the threshold voltage and include the relatively fewer transistors compared to the earlier pixel circuit, so that the high integration may be achieved. Thus, the pixel circuit may be applicable to an ultra-high resolution display apparatus.

In the timing diagram of the pixel circuit, the control electrode of the first transistor T1, the control electrode of the sixth transistor T6 and the anode electrode NA of the light emitting element EE may be initialized in the initialization period DR1 so that the number of the transistors for the initialization may decrease and the time for initialization may be reduced.

Figure 18:
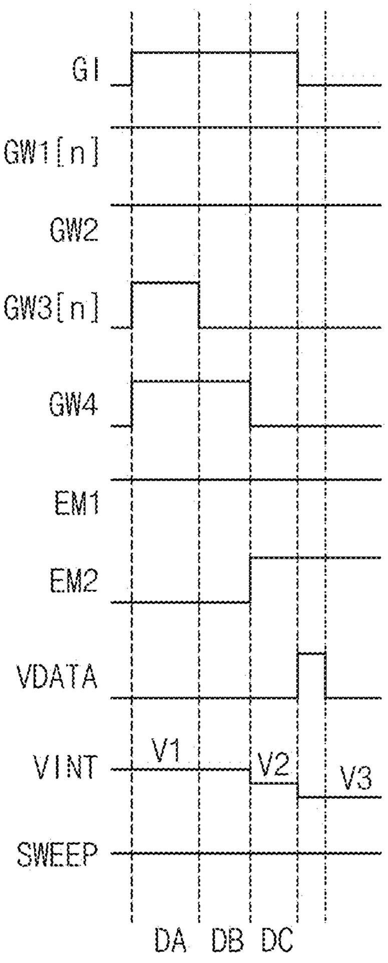
FIG. 18 is a schematic timing diagram illustrating an example of input signals applied to the pixel circuit of FIG. 2 in a first period of the timing diagram.

FIG. 18 is a schematic timing diagram illustrating an example of input signals applied to the pixel circuit of FIG. 2 in a first period of the timing diagram.

The pixel circuit according to the embodiment may be substantially the same as the pixel circuit of the previous embodiment explained referring to FIG. 2. The timing diagram according to the embodiment may be substantially the same as the timing diagram of the previous embodiment explained referring to FIG. 3 except for the initialization period DR1. Thus, the same reference numerals will be used to refer to the same or like parts as those described in the previous embodiment and any repetitive explanation concerning the above elements will be omitted.

Referring to FIGS. 1 to 13 and 18, the pixel circuit includes a first transistor T1 including a control electrode electrically connected to a first node N1, a first electrode electrically connected to a second node N2 and a second electrode electrically connected to a third node N3, a second transistor T2 applying a first data voltage VPMW to the first transistor T1, a third transistor T3 electrically connected to the first node N1 and the third node N3, a sixth transistor T6 including a control electrode electrically connected to a fourth node N4, a first electrode electrically connected to a fifth node N5 and a second electrode electrically connected to a sixth node N6, a seventh transistor T7 applying a second data voltage VCCG to the sixth transistor T6, an eighth transistor T8 electrically connected to the fourth node N4 and the sixth node N6 and a light emitting element EE that emits light based on the first data voltage VPWM and the second data voltage VCCG.

In the embodiment, the initialization period DR1 may include a first initialization period DA, a second initialization period DB and a third initialization period DC.

In the first initialization period DA, the third transistor T3, the fifth transistor T5, the eighth transistor T8, the tenth transistor T10 and the eleventh transistor T11 may be turned on and the initialization voltage may have a first voltage V1. In the second initialization period DB subsequent to the first initialization period DA, the third transistor T3 may be turned off, the eighth transistor T8, the tenth transistor T10 and the eleventh transistor T11 may remain turned on and the initialization voltage may still have the first voltage V1. In the third initialization period DC subsequent to the second initialization period DB, the third transistor T3 and the eighth transistor T8 may be turned off, the tenth transistor T10 and the eleventh transistor T11 may remain turned on and the initialization voltage may have a second voltage V2 different from the first voltage V1.

In the embodiment, the second voltage V2 may be less than the first voltage V1.

In the first initialization period DA, the control electrode of the first transistor T1 may be initialized to the first voltage V1. In the second initialization period DB, the control electrode of the sixth transistor T6 may be initialized to the first voltage V1. In the third initialization period DC, the anode electrode NA may be initialized to the second voltage V2.

In the embodiment, the initialization voltages VINT for the first transistor T1, the sixth transistor T6 and the anode electrode NA may be differently set so that the performance of the initialization may be improved.

Figure 19:
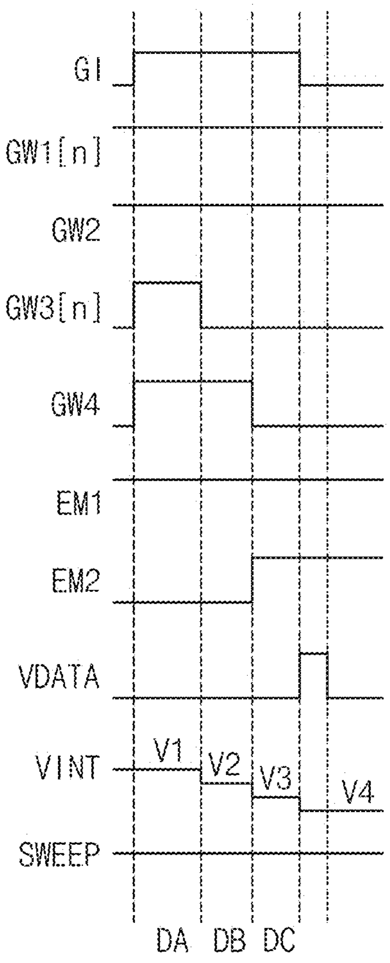
FIG. 19 is a schematic timing diagram illustrating an example of input signals applied to the pixel circuit of FIG. 2 in a first period of the timing diagram.

FIG. 19 is a schematic timing diagram illustrating an example of input signals applied to the pixel circuit of FIG. 2 in a first period of the timing diagram.

The pixel circuit according to the embodiment may be substantially the same as the pixel circuit of the previous embodiment explained referring to FIG. 2. The timing diagram according to the embodiment may be substantially the same as the timing diagram of the previous embodiment explained referring to FIG. 3 except for the initialization period DR1. Thus, the same reference numerals will be used to refer to the same or like parts as those described in the previous embodiment and any repetitive explanation concerning the above elements will be omitted.

Referring to FIGS. 1 to 13 and 19, the pixel circuit includes a first transistor T1 including a control electrode electrically connected to a first node N1, a first electrode electrically connected to a second node N2 and a second electrode electrically connected to a third node N3, a second transistor T2 applying a first data voltage VPMW to the first transistor T1, a third transistor T3 electrically connected to the first node N1 and the third node N3, a sixth transistor T6 including a control electrode electrically connected to a fourth node N4, a first electrode electrically connected to a fifth node N5 and a second electrode electrically connected to a sixth node N6, a seventh transistor T7 applying a second data voltage VCCG to the sixth transistor T6, an eighth transistor T8 electrically connected to the fourth node N4 and the sixth node N6 and a light emitting element EE that emits light based on the first data voltage VPWM and the second data voltage VCCG.

In the embodiment, the initialization period DR1 may include a first initialization period DA, a second initialization period DB and a third initialization period DC.

In the first initialization period DA, the third transistor T3, the fifth transistor T5, the eighth transistor T8, the tenth transistor T10 and the eleventh transistor T11 may be turned on and the initialization voltage may have a first voltage V1. In the second initialization period DB subsequent to the first initialization period DA, the third transistor T3 may be turned off, the eighth transistor T8, the tenth transistor T10 and the eleventh transistor T11 may remain turned on and the initialization voltage may have a second voltage V2 different from the first voltage V1. In the third initialization period DC subsequent to the second initialization period DB, the third transistor T3 and the eighth transistor T8 may be turned off, the tenth transistor T10 and the eleventh transistor T11 may remain turned on and the initialization voltage may have a third voltage V3 different from the first voltage V1 and the second voltage V2.

In the first initialization period DA, the control electrode of the first transistor T1 may be initialized to the first voltage V1. In the second initialization period DB, the control electrode of the sixth transistor T6 may be initialized to the second voltage V2. In the third initialization period DC, the anode electrode NA may be initialized to the third voltage V3.

In the embodiment, the initialization voltages VINT for the first transistor T1, the sixth transistor T6 and the anode electrode NA may be differently set so that the performance of the initialization may be improved.

Figure 20:
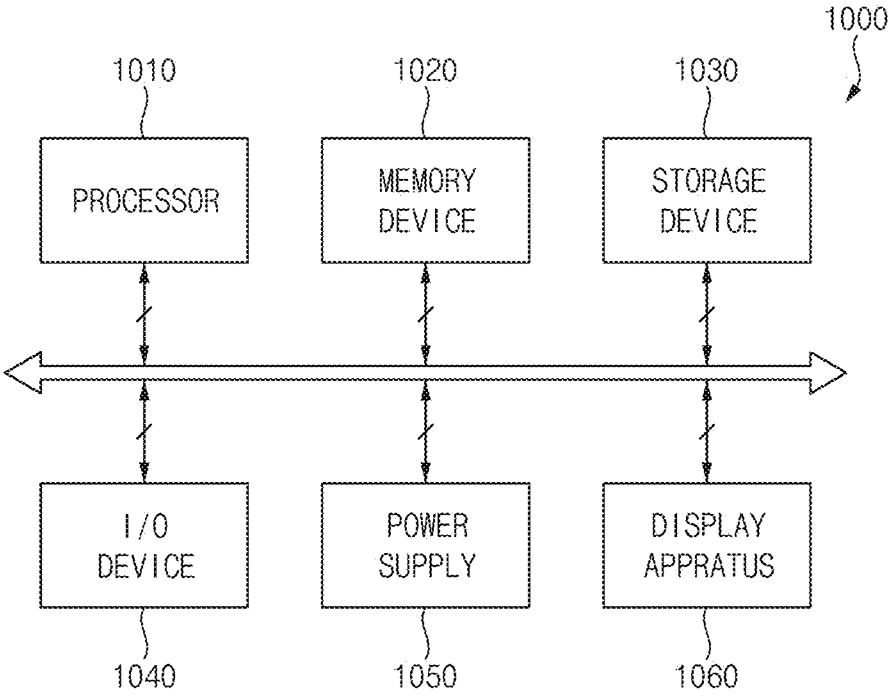
FIG. 20 is a schematic block diagram illustrating an electronic apparatus according to an embodiment of the inventive concept.
Figure 21:
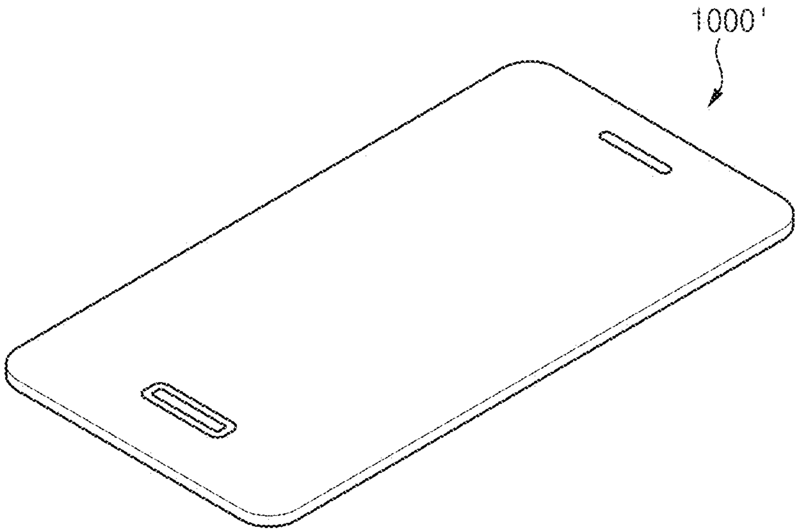
FIG. 21 is a schematic diagram illustrating an example in which the electronic apparatus of FIG. 20 is implemented as a smart phone.

FIG. 20 is a schematic block diagram illustrating an electronic apparatus according to an embodiment of the inventive concept. FIG. 21 is a schematic diagram illustrating an example in which the electronic apparatus of FIG. 20 is implemented as a smart phone.

Referring to FIGS. 20 and 21, the electronic apparatus 1000 may include a processor 1010, a memory device 1020, a storage device 1030, an input/output (I/O) device 1040, a power supply 1050 and a display apparatus 1060. Here, the display apparatus 1060 may be the display apparatus of FIG. 1. The electronic apparatus 1000 may further include multiple ports for communicating with a video card, a sound card, a memory card, a universal serial bus (USB) device, other electronic apparatuses, etc.

In an embodiment, as illustrated in FIG. 21, the electronic apparatus 1000 may be implemented as a smart phone 1000'. However, the electronic apparatus 1000 may not be limited thereto. For example, the electronic apparatus 1000 may be implemented as a cellular phone, a video phone, a smart pad, a smart watch, a tablet PC, a car navigation system, a computer monitor, a laptop, a head mounted display (HMD) device, and the like.

The processor 1010 may perform various computing functions or various tasks. The processor 1010 may be a microprocessor, a central processing unit (CPU), an application processor (AP), and the like. The processor 1010 may be electrically connected to other components via an address bus, a control bus, a data bus, etc. Further, the processor 1010 may be electrically connected to an extended bus such as a peripheral component interconnection (PCI) bus.

The processor 1010 may output the input image data IMG and the input control signal CONT to the driving controller 200 of FIG. 1.

The memory device 1020 may store data for operations of the electronic apparatus 1000. For example, the memory device 1020 may include at least one non-volatile memory device such as an erasable programmable read-only memory (EPROM) device, an electrically erasable programmable read-only memory (EEPROM) device, a flash memory device, a phase change random access memory (PRAM) device, a resistance random access memory (RRAM) device, a nano floating gate memory (NFGM) device, a polymer random access memory (PoRAM) device, a magnetic random access memory (MRAM) device, a ferroelectric random access memory (FRAM) device, and the like and/or at least one volatile memory device such as a dynamic random access memory (DRAM) device, a static random access memory (SRAM) device, a mobile DRAM device, and the like.

The storage device 1030 may include a solid state drive (SSD) device, a hard disk drive (HDD) device, a CD-ROM device, and the like. The I/O device 1040 may include an input device such as a keyboard, a keypad, a mouse device, a touch-pad, a touch-screen, and the like and an output device such as a printer, a speaker, and the like. In some embodiments, the display apparatus 1060 may be included in the I/O device 1040. The power supply 1050 may provide power for operations of the electronic apparatus 1000. The display apparatus 1060 may be electrically connected to other components via the buses or other communication links.

Figure 22:
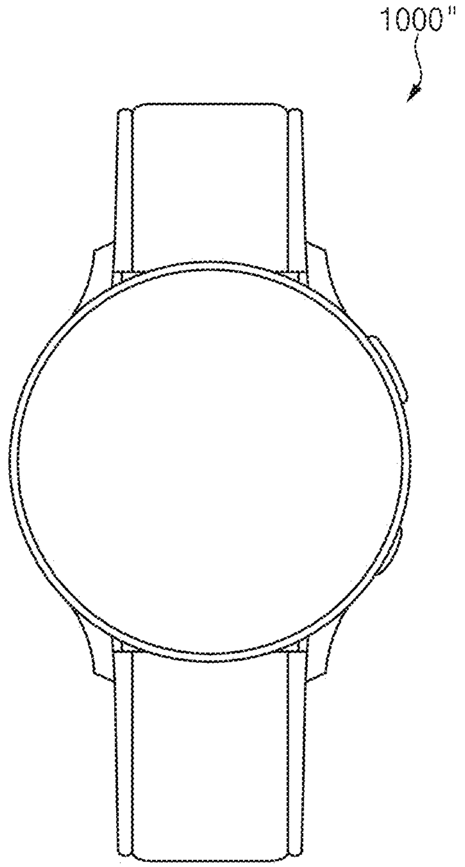
FIG. 22 is a schematic diagram illustrating an example in which the electronic apparatus of FIG. 20 is implemented as a smart watch.

FIG. 22 is a schematic diagram illustrating an example in which the electronic apparatus of FIG. 20 is implemented as a smart watch.

Referring to FIGS. 20 and 22, the electronic apparatus may be implemented as a smart watch 1000". The smart watch 1000" may be an example of the electronic apparatus requiring an ultra-high resolution display panel.

According to the pixel circuit and the display apparatus of the inventive concept as explained above, the ultra-high resolution display apparatus may be implemented using the pixel circuit having the high integration.

The foregoing may be illustrative of the inventive concept and may not be to be construed as limiting thereof. Although a few embodiments of the inventive concept have been described, those skilled in the art will readily appreciate that many modifications may be possible in the embodiments without materially departing from the novel teachings and advantages of the inventive concept. Accordingly, all such modifications may be intended to be included within the scope of the inventive concept as defined in the claims. In the claims, means-plus-function clauses may be intended to cover the structures described herein as performing the recited function and not only structural equivalents but also equivalent structures. Therefore, it may be to be understood that the foregoing may be illustrative of the inventive concept and may not be to be construed as limited to the specific embodiments disclosed, and that modifications to the disclosed embodiments, as well as other embodiments, may be intended to be included within the scope of the appended claims. The inventive concept may be defined by the following claims, with equivalents of the claims to be included therein.

What is claimed is:

1. A pixel circuit comprising:

a first transistor including a control electrode electrically connected to a first node, a first electrode electrically connected to a second node and a second electrode electrically connected to a third node;

a second transistor configured to apply a first data voltage to the first transistor during a first compensation period, the second transistor being connected to a first gate signal line that supplies a first gate signal;

a third transistor electrically connected to the first node and the third node;

a fourth transistor including a control electrode electrically connected to a fourth node, a first electrode electrically connected to a fifth node and a second electrode electrically connected to a sixth node;

a fifth transistor configured to apply a second data voltage to the fourth transistor during a second compensation period after the first compensation period, the fifth transistor being connected to a second gate signal line different from the first gate signal line that supplies a second gate signal;

a sixth transistor electrically connected to the fourth node and the sixth node; and a light emitting element that emits light based on the first data voltage and the second data voltage.

2. The pixel circuit of claim 1, further comprising:

a first capacitor including a first electrode that receives a sweep signal and a second electrode electrically connected to the first node.

3. The pixel circuit of claim 2, further comprising:

a second capacitor including a first electrode that receives a second power voltage and a second electrode electrically connected to the fourth node.

4. The pixel circuit of claim 1, further comprising:

a seventh transistor electrically connected to the third node and the fourth node;

an eighth transistor electrically connected to the sixth node and an anode electrode of the light emitting element; and a ninth transistor configured to apply an initialization voltage to the anode electrode.

5. The pixel circuit of claim 4, wherein the third transistor, the seventh transistor, the sixth transistor, the eighth transistor and the ninth transistor are turned on in an initialization period.

6. The pixel circuit of claim 4, wherein the third transistor, the seventh transistor, the sixth transistor, the eighth transistor and the ninth transistor are turned on and the initialization voltage has a first voltage in a first initialization period, the third transistor is turned off, the sixth transistor, the eighth transistor and the ninth transistor are turned on and the initialization voltage has the first voltage in a second initialization period subsequent to the first initialization period, and the third transistor and the sixth transistor are turned off, the eighth transistor and the ninth transistor are turned on and the initialization voltage has a second voltage different from the first voltage in a third period subsequent to the second initialization period.

7. The pixel circuit of claim 6, wherein the second voltage is less than the first voltage.

8. The pixel circuit of claim 4, wherein the third transistor, the seventh transistor, the sixth transistor, the eighth transistor and the ninth transistor are turned on and the initialization voltage has a first voltage in a first initialization period, the third transistor is turned off, the sixth transistor, the eighth transistor and the ninth transistor are turned on and the initialization voltage has a second voltage different from the first voltage in a second initialization period subsequent to the first initialization period, and the third transistor and the sixth transistor are turned off, the eighth transistor and the ninth transistor are turned on and the initialization voltage has a third voltage different from the first voltage and the second voltage in a third initialization period subsequent to the second initialization period.

9. The pixel circuit of claim 1, wherein the first transistor, the second transistor, the fourth transistor and the fifth transistor are P-type transistors, and the third transistor and the sixth transistor are N-type transistors.

10. The pixel circuit of claim 9, further comprising:

a ninth transistor configured to apply an initialization voltage to an anode electrode of the light emitting element, wherein the ninth transistor is an N-type transistor.

11. The pixel circuit of claim 1, wherein the first transistor, the second transistor, the fourth transistor, the fifth transistor and the sixth transistor are P-type transistors, and the third transistor is an N-type transistor.

12. The pixel circuit of claim 11, further comprising:

a ninth transistor configured to apply an initialization voltage to an anode electrode of the light emitting element, wherein the ninth transistor is an N-type transistor.

13. The pixel circuit of claim 1, wherein the first transistor, the second transistor, the third transistor, the fourth transistor, the fifth transistor and the sixth transistor are P-type transistors.

14. The pixel circuit of claim 1, wherein the second transistor includes a control electrode that receives a first writing gate signal, a first electrode that receives the first data voltage and a second electrode electrically connected to the second node, the third transistor includes a control electrode that receives a second writing gate signal, a first electrode electrically connected to the first node and a second electrode electrically connected to the third node, the fifth transistor includes a control electrode that receives a third writing gate signal, a first electrode that receives the second data voltage and a second electrode electrically connected to the fifth node, the sixth transistor includes a control electrode that receives a fourth writing gate signal, a first electrode electrically connected to the fourth node and a second electrode electrically connected to the sixth node, the light emitting element includes an anode electrode and a cathode electrode that receives a third power voltage, and the pixel circuit further comprises:

a first capacitor including a first electrode that receives a sweep signal and a second electrode electrically connected to the first node;

a second capacitor including a first electrode that receives a second power voltage and a second electrode electrically connected to the fourth node;

a seventh transistor including a control electrode that receives a first emission signal, a first electrode that receives a first power voltage and a second electrode electrically connected to the second node;

an eighth transistor including a control electrode that receives a second emission signal, a first electrode electrically connected to the third node and a second electrode electrically connected to the fourth node;

a ninth transistor including a control electrode that receives the first emission signal, a first electrode that receives the second power voltage and a second electrode electrically connected to the fifth node;

a tenth transistor including a control electrode that receives the second emission signal, a first electrode electrically connected to the sixth node and a second electrode electrically connected to the anode electrode; and an eleventh transistor including a control electrode that receives an initialization gate signal, a first electrode that receives an initialization voltage and a second electrode electrically connected to the anode electrode.

15. The pixel circuit of claim 14, wherein the initialization gate signal has an active level, the first writing gate signal has an inactive level, the third writing gate signal has an inactive level, the second writing gate signal has an active level, the fourth writing gate signal has an active level, the first emission signal has an inactive level, the second emission signal has an active level and the sweep signal has a first level in a first period.

16. The pixel circuit of claim 15, wherein the initialization gate signal has an inactive level, the first writing gate signal has an active pulse, the third writing gate signal has the inactive level, the second writing gate signal has an active pulse, the fourth writing gate signal has an inactive level, the first emission signal has the inactive level, the second emission signal has an inactive level and the sweep signal has the first level in a second period subsequent to the first period.

17. The pixel circuit of claim 16, wherein the initialization gate signal has the inactive level, the first writing gate signal has the inactive level, the third writing gate signal has an active level, the second writing gate signal has an inactive level, the fourth writing gate signal has the active level, the first emission signal has the inactive level, the second emission signal has the inactive level and the sweep signal has the first level in a third period subsequent to the second period.

18. The pixel circuit of claim 17, wherein the initialization gate signal has the inactive level, the first writing gate signal has the inactive level, the third writing gate signal has the inactive level, the second writing gate signal has the inactive level, the fourth writing gate signal has the inactive level, the first emission signal has an active level, the second emission signal has an active level and the sweep signal gradually decreases from the first level in a fourth period subsequent to the third period.

19. The pixel circuit of claim 14, wherein the first power voltage is greater than the second power voltage.

20. The pixel circuit of claim 1, wherein a first electrode of the second transistor is electrically connected to a data voltage terminal, and a first electrode of the fifth transistor is electrically connected to the data voltage terminal.

21. The pixel circuit of claim 1, wherein a first electrode of the second transistor is electrically connected to a first data voltage terminal, and a first electrode of the fifth transistor is electrically connected to a second data voltage terminal different from the first data voltage terminal.

22. The pixel circuit of claim 1, wherein, when turned on, the fifth transistor passes current between the third node and the fourth node.

23. A display apparatus comprising:

a display panel including a pixel circuit;

a gate driver configured to output a gate signal to the pixel circuit; and a data driver configured to output a data voltage to the pixel circuit, wherein the pixel circuit comprises:

a first transistor including a control electrode electrically connected to a first node, a first electrode electrically connected to a second node and a second electrode electrically connected to a third node;

a second transistor configured to apply a first data voltage to the first transistor during a first compensation period, the second transistor being connected to a first gate signal line that supplies a first gate signal;

a third transistor electrically connected to the first node and the third node;

a fourth transistor including a control electrode electrically connected to a fourth node, a first electrode electrically connected to a fifth node and a second electrode electrically connected to a sixth node;

a fifth transistor configured to apply a second data voltage to the fourth transistor during a second compensation period after the first compensation period, the fifth transistor being connected to a second gate signal line different from the first gate signal line that supplies a second gate signal;

a sixth transistor electrically connected to the fourth node and the sixth node; and a light emitting element that emits light based on the first data voltage and the second data voltage.

* * * * *